(12) United States Patent
Austrheim

(10) Patent No.: US 11,312,575 B2
(45) Date of Patent: Apr. 26, 2022

(54) CONTAINER HANDLING VEHICLE WITH FIRST AND SECOND SECTIONS AND WITH BATTERY IN SECOND SECTION

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 17/047,307

(22) PCT Filed: Oct. 11, 2018

(86) PCT No.: PCT/EP2018/077732
§ 371 (c)(1),
(2) Date: Oct. 13, 2020

(87) PCT Pub. No.: WO2019/206440
PCT Pub. Date: Oct. 31, 2019

(65) Prior Publication Data
US 2021/0155408 A1 May 27, 2021

(30) Foreign Application Priority Data
Apr. 25, 2018 (NO) .................................. 20180591

(51) Int. Cl.
*B65G 1/137* (2006.01)
(52) U.S. Cl.
CPC .................................. *B65G 1/1375* (2013.01)
(58) Field of Classification Search
CPC .................................................. B65G 1/1375
See application file for complete search history.

(56) References Cited

U.S. PATENT DOCUMENTS

| 3,051,321 A | 8/1962 | Ramsden |
|---|---|---|
| 2004/0101393 A1 | 5/2004 | Lopez Alba |

(Continued)

FOREIGN PATENT DOCUMENTS

| CN | 106575393 A | 4/2017 |
|---|---|---|
| CN | 206750705 U | 12/2017 |

(Continued)

OTHER PUBLICATIONS

Office Action in counterpart Chinese Patent Application No. 201880092704.2 dated Aug. 3, 2021 (14 pages).

(Continued)

*Primary Examiner* — Kyle O Logan
(74) *Attorney, Agent, or Firm* — Osha Bergman Watanabe & Burton LLP

(57) ABSTRACT

A container handling vehicle for picking up storage containers from a three-dimensional grid of an underlying storage system includes a first set of wheels arranged at opposite portions of a vehicle body, for moving the vehicle along a first direction on a rail system in the grid; a second set of wheels arranged at opposite portions of the vehicle body, for moving the vehicle along a second direction on the rail system in the grid. The second direction is perpendicular to the first direction. The vehicle body includes walls on all sides and forms a quadrilateral footprint. A first section and a second section arranged side-by-side such that a centre point of the first section is arranged off centre relative a centre point of the footprint formed by the vehicle body. A size ratio of a footprint of the first section relative a footprint of the second section is at least 2:1. The first section is configured to accommodate a storage container, and the second section includes at least a first battery.

14 Claims, 15 Drawing Sheets

(56) References Cited

U.S. PATENT DOCUMENTS

| | | | |
|---|---|---|---|
| 2015/0098775 A1 | 4/2015 | Razumov | |
| 2015/0127143 A1* | 5/2015 | Lindbo | B65G 1/137 700/218 |
| 2016/0129587 A1* | 5/2016 | Lindbo | B25J 9/0093 700/218 |
| 2016/0145058 A1* | 5/2016 | Lindbo | B65G 1/0485 700/218 |
| 2016/0325932 A1* | 11/2016 | Hognaland | B65G 1/065 |
| 2017/0152111 A1 | 6/2017 | Kinugawa et al. | |
| 2018/0029798 A1 | 2/2018 | Lindbo et al. | |
| 2018/0065804 A1* | 3/2018 | Hognaland | B65G 1/0464 |
| 2018/0072546 A1 | 3/2018 | Hognaland | |
| 2018/0075402 A1* | 3/2018 | Stadie | G05D 1/0297 |
| 2018/0162639 A1* | 6/2018 | Ingram-Tedd | B65G 1/1378 |
| 2018/0194571 A1* | 7/2018 | Fryer | B65G 45/10 |
| 2018/0237221 A1* | 8/2018 | Lindbo | B65G 1/0464 |
| 2018/0244467 A1* | 8/2018 | Hognaland | B65G 1/0464 |
| 2018/0346243 A1* | 12/2018 | Lindbo | B65G 1/1373 |
| 2019/0031399 A1* | 1/2019 | Shaikh | B65D 21/0209 |
| 2019/0054932 A1* | 2/2019 | Stadie | B08B 3/02 |
| 2019/0375588 A1* | 12/2019 | Lindbo | B65G 1/0492 |
| 2020/0031575 A1* | 1/2020 | Hognaland | B65G 1/065 |

FOREIGN PATENT DOCUMENTS

| | | |
|---|---|---|
| JP | S64-24090 U | 2/1989 |
| JP | H02-11455 A | 1/1990 |
| JP | H08-38268 A | 2/1996 |
| KR | 20060064298 A | 6/2006 |
| NO | 317366 B1 | 10/2004 |
| WO | 2014/090684 A1 | 6/2014 |
| WO | 2015/193278 A1 | 12/2015 |
| WO | 2016/120075 A1 | 8/2016 |
| WO | 2017/081275 A1 | 5/2017 |
| WO | 2017/081281 A1 | 5/2017 |
| WO | 2017/129384 A1 | 8/2017 |
| WO | 2017/153583 A1 | 9/2017 |
| WO | 2017/220627 A1 | 12/2017 |
| WO | 2018/060527 A1 | 4/2018 |

OTHER PUBLICATIONS

International Search Report issued in Application No. PCT/EP2018/077687, dated Jan. 21, 2019 (16 pages).
Written Opinion issued in International Application No. PCT/EP2018/077687, dated Jan. 19, 2020 (13 pages).
International Preliminary Report on Patentability issued in Application No. PCT/EP2018/077687, dated Aug. 3, 2020 (19 pages).
Search Report issued in Norwegian U.S. Appl. No. 20/180,589, dated Nov. 23, 2018 (2 pages).
International Search Report issued in PCT/EP2018/077732 dated Jan. 17, 2019 (5 pages).
Written Opinion of the International Searching Authority issued in PCT/EP2018/077732 dated Jan. 17, 2019 (11 pages).
Norwegian Search Report issued in NO 20180591 dated Nov. 23, 2018 (2 pages).
International Search Report issued in PCT/EP2018/077713 dated Jan. 15, 2019 (7 pages).
Written Opinion of the International Searching Authority issued in PCT/EP2018/077713 dated Jan. 15, 2019 (11 pages).
Wikipedia; "Brushless DC electric motor"; Internet URL: https://en.wikipedia.org/wiki/Brushless_DC_electric_motor; Oct. 13, 2020 (9 pages).
Ahn, Jin-Woo; "Switched Reluctance Motor"; Torque Control; Internet URL: http://cdn.intechweb.org/pdfs/13717.pdf; retrieved Oct. 13, 2020, pp. 201-252 (54 pages).

* cited by examiner

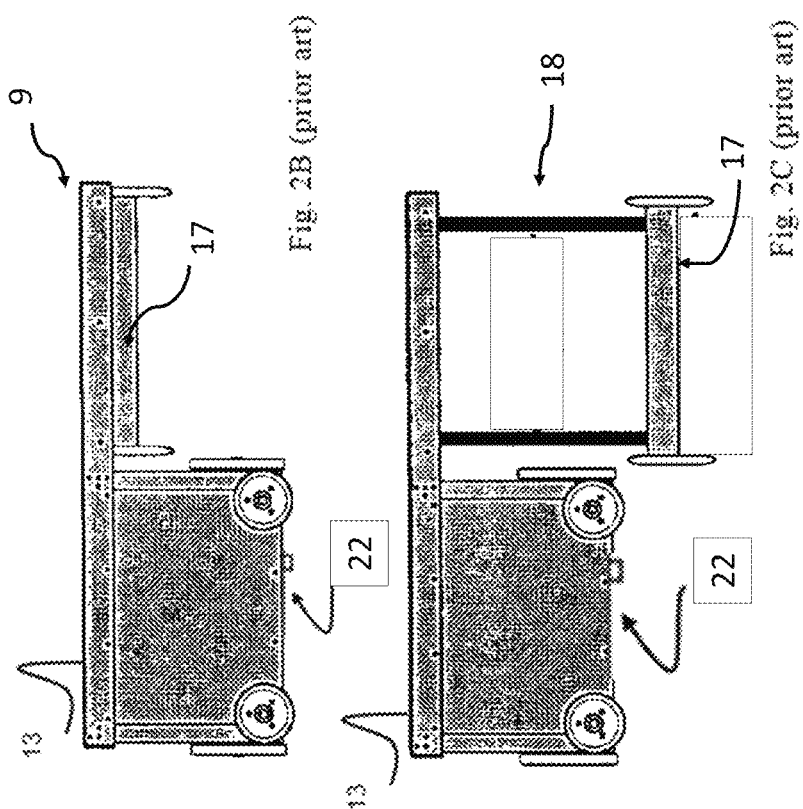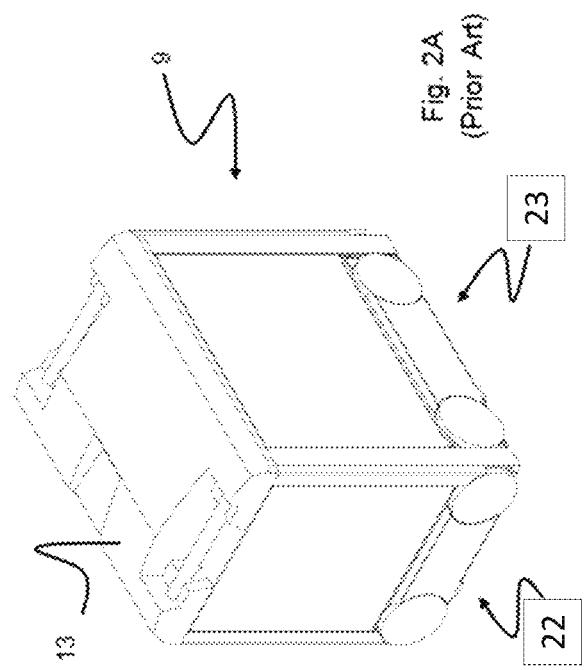

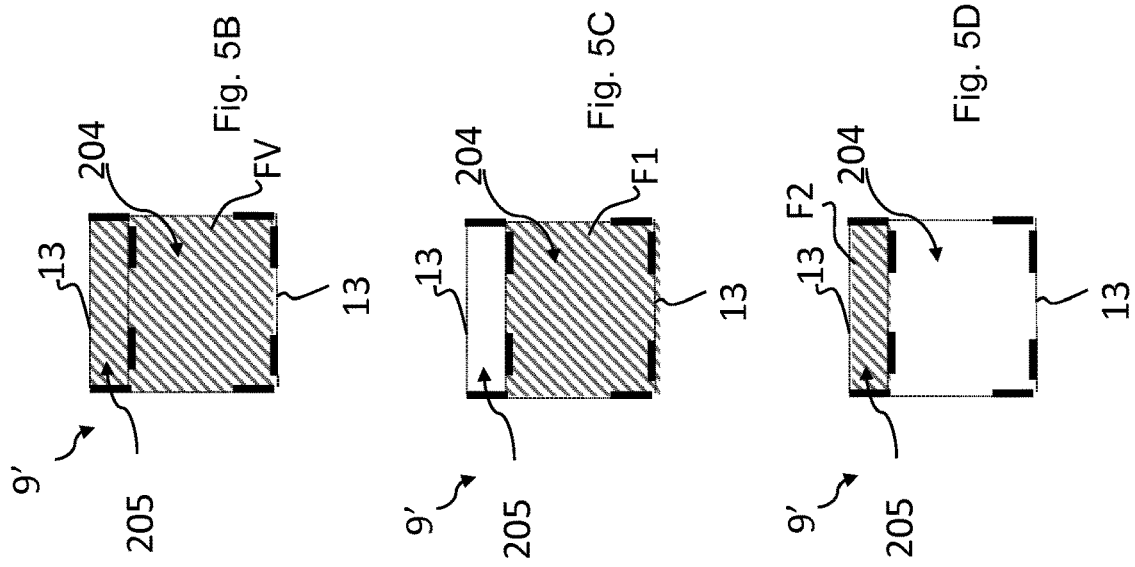
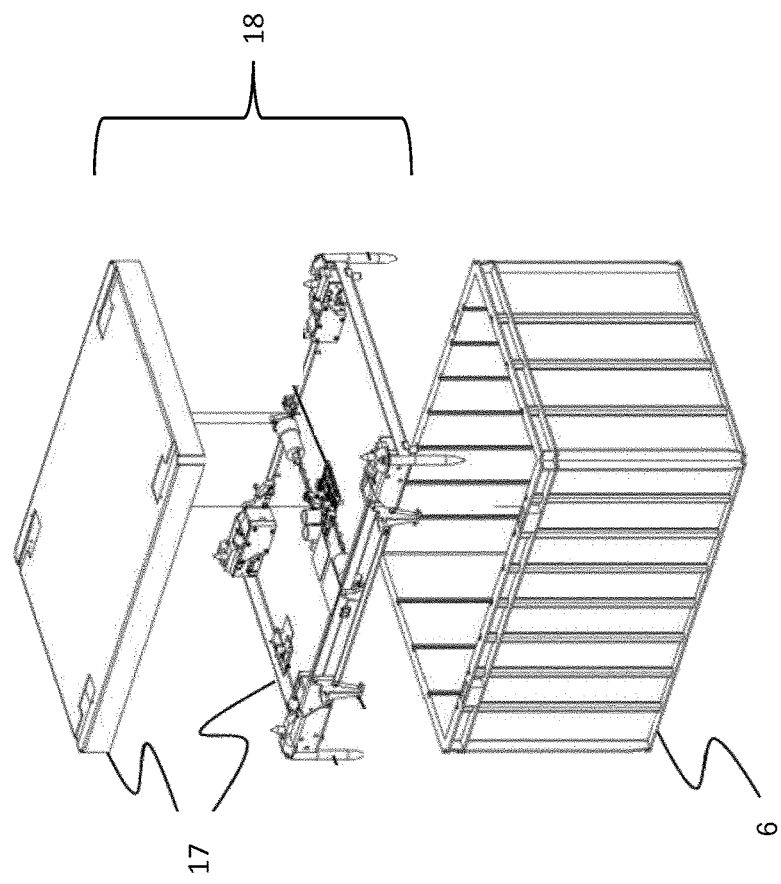

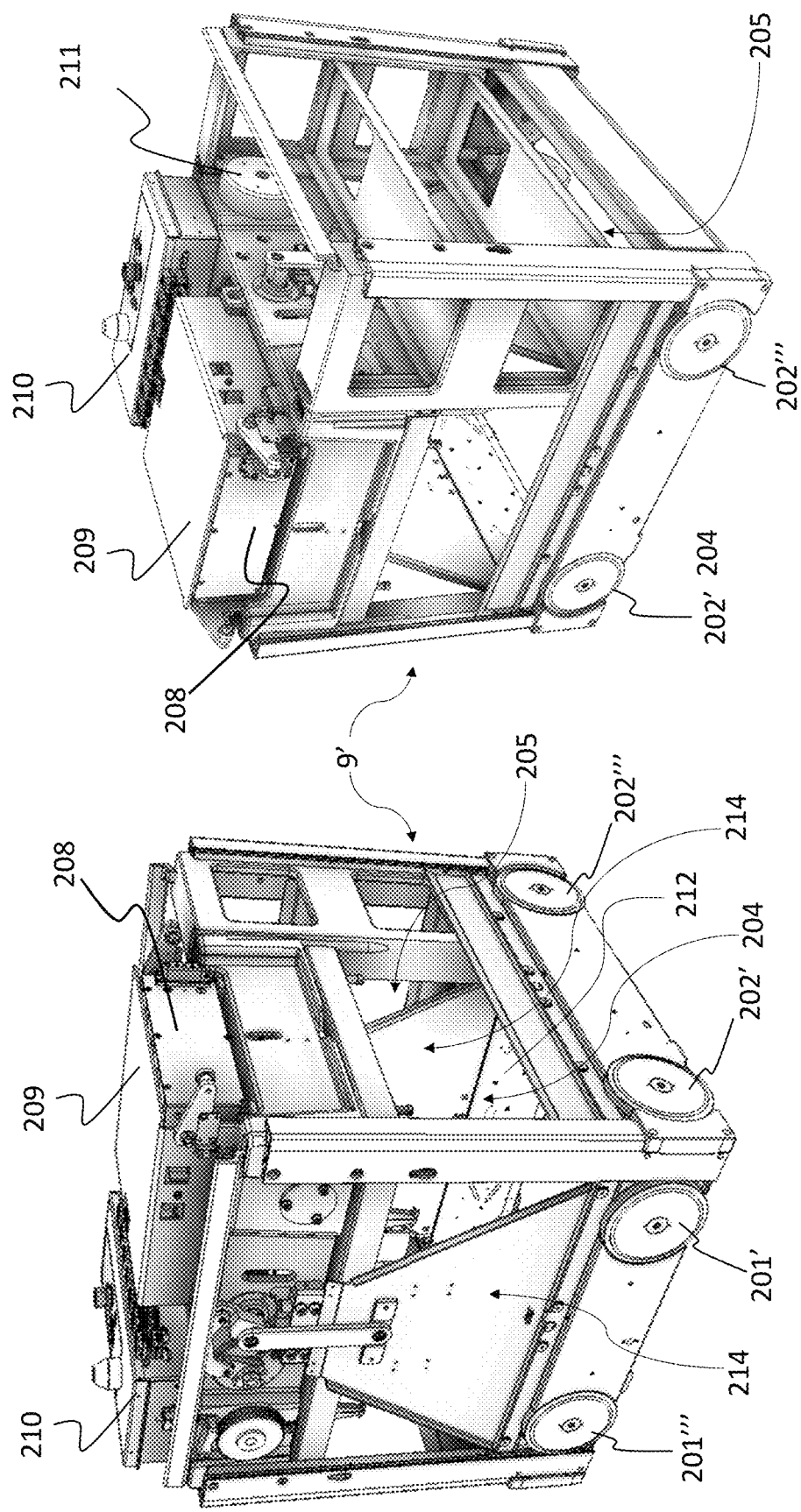

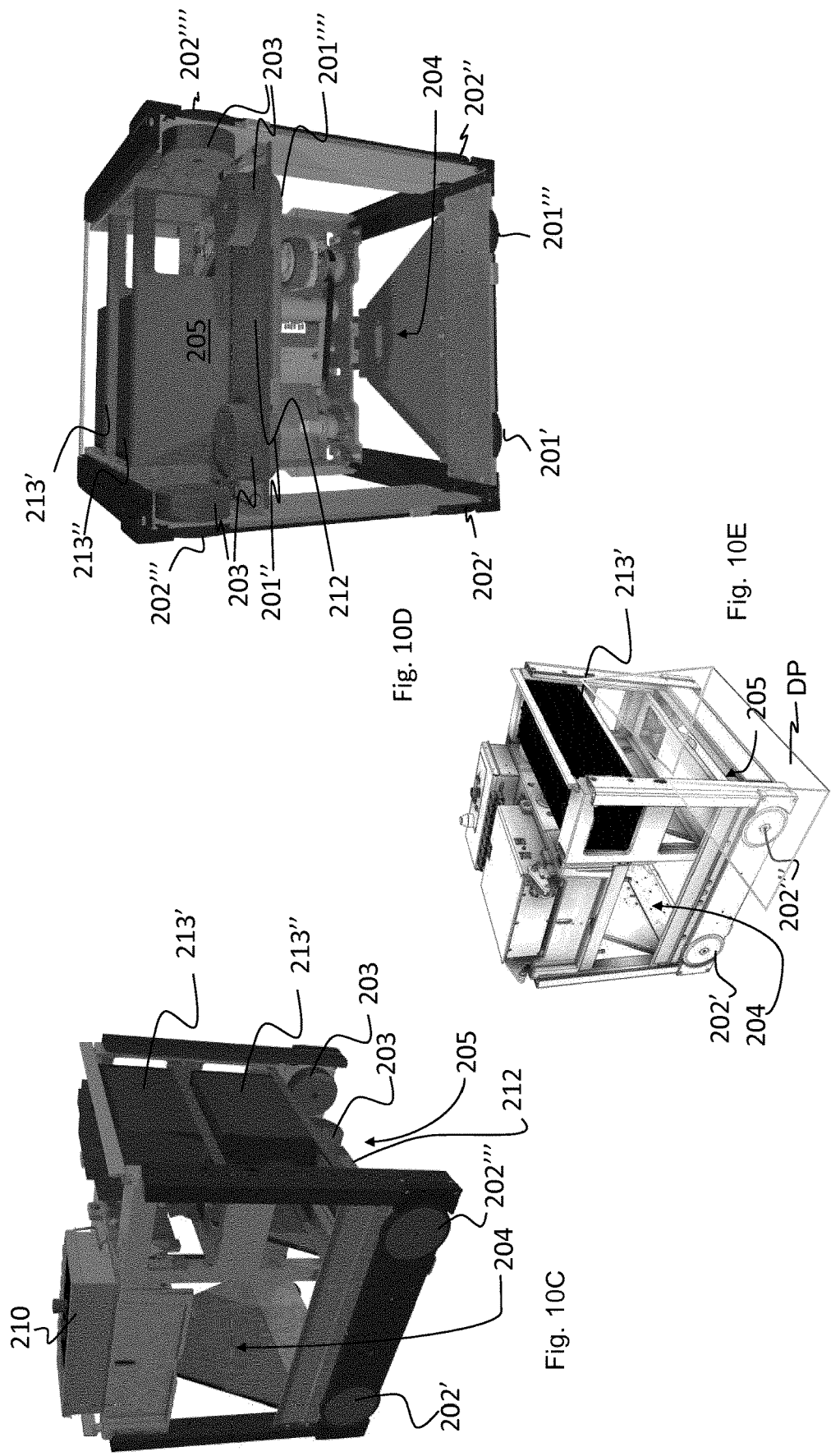

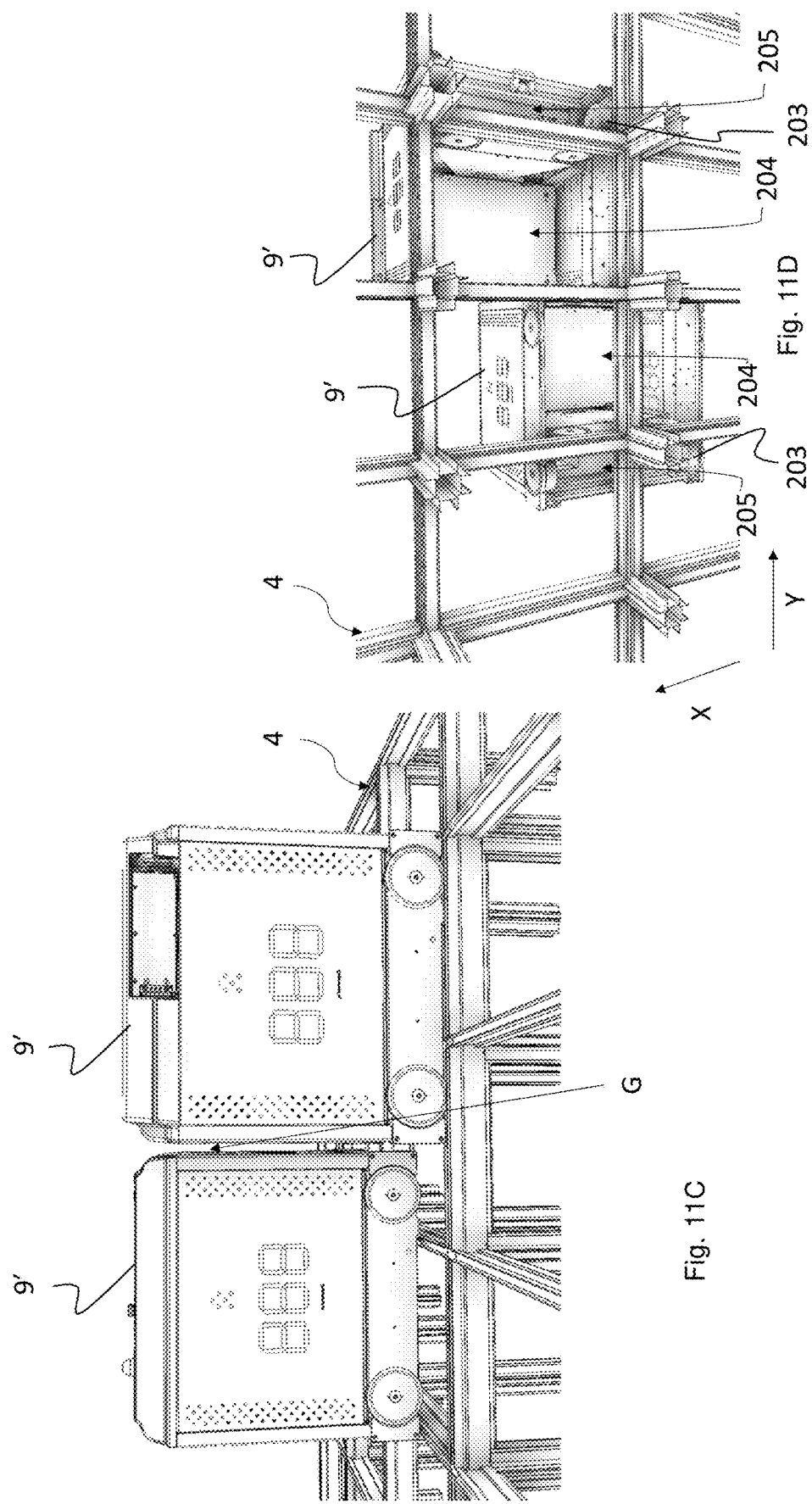

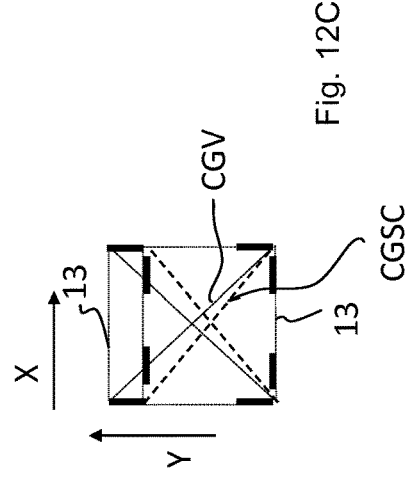
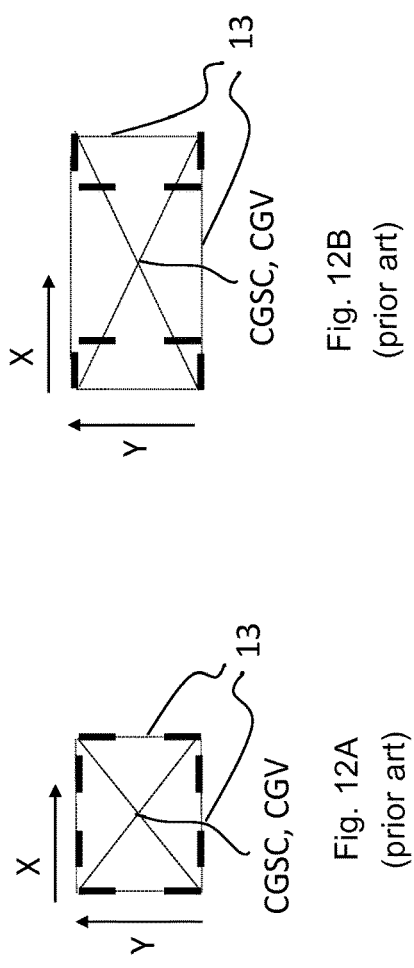
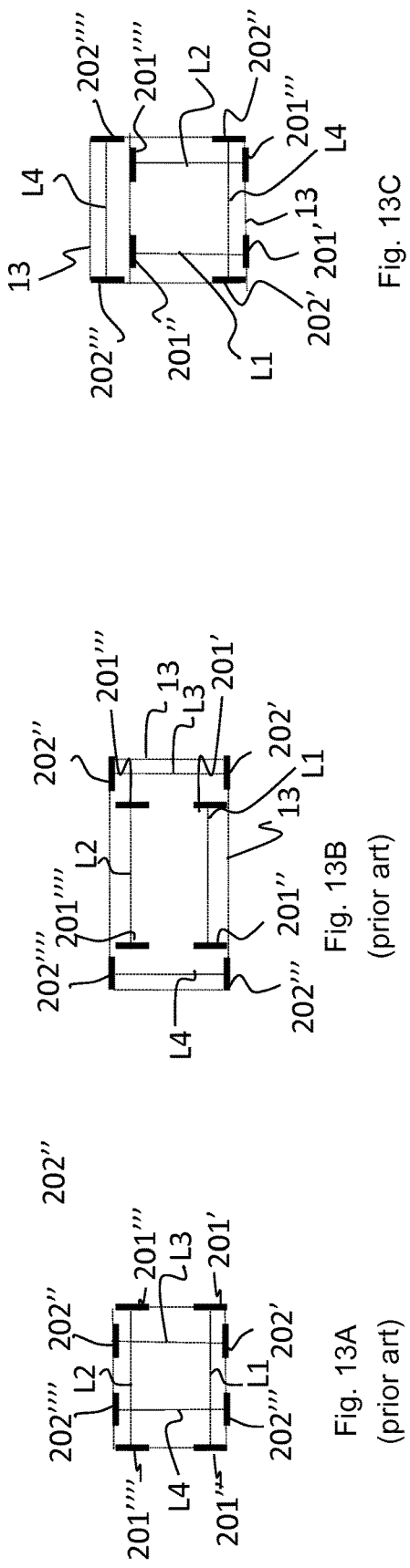

CONTAINER HANDLING VEHICLE WITH FIRST AND SECOND SECTIONS AND WITH BATTERY IN SECOND SECTION

The present invention relates to the field container handling vehicles for automated storage and retrieval systems and to automated storage and retrieval systems comprising such container handling vehicles.

BACKGROUND

The Applicant's already known AutoStore system is a storage system comprising a three-dimensional storage grid structure wherein storage containers/containers are stacked on top of each other to a certain height. Such a prior art system is shown in FIG. 1.

The storage system is disclosed in detail in for instance NO317366 and WO 2014/090684 A1.

FIG. 1 discloses a framework structure of a typical prior art automated storage and retrieval system 1 and FIGS. 2a and 2b disclose known container handling vehicles of such a system.

The framework structure comprises a plurality of upright members/profiles 2 and a plurality of horizontal members 3, which are supported by the upright members 2. The members 2, 3 may typically be made of metal, e.g. extruded aluminium profiles.

The framework structure defines a storage grid 4 comprising multiple grid opening/columns 12 arranged in rows. A majority of the grid columns 12 are storage columns 5 in which storage containers 6, also known as containers or bins, are stacked one on top of another to form stacks 7. Each storage container 6 (or container for short) may typically hold a plurality of product items (not shown), and the product items within a storage container 6 may be identical, or may be of different product types depending on the application. The framework structure guards against horizontal movement of the stacks 7 of storage containers 6, and guides vertical movement of the containers 6, but does normally not otherwise support the storage containers 6 when stacked.

The upper horizontal members 3 comprise a rail system 8 arranged in a grid pattern across the top of the grid columns 12, on which rail system 8 a plurality of container handling vehicles 9 are operated to raise storage containers 6 from and lower storage containers 6 into the storage columns 5, and also to transport the storage containers 6 above the storage columns 5. The rail system 8 comprises a first set of parallel rails 10 arranged to guide movement of the container handling vehicles 9 in a first direction X across the top of the frame structure 1, and a second set of parallel rails 11 arranged perpendicular to the first set of rails 10 to guide movement of the container handling vehicles 9 in a second direction Y, which is perpendicular to the first direction X, see FIG. 3. In this way, the rail system 8 defines an upper end of the storage columns 5, above which the container handling vehicles 9 can move laterally above the storage columns 5, i.e. in a plane, which is parallel to the horizontal X-Y plane.

Each container handling vehicle 9 comprises a vehicle body 13 and first and second sets of wheels 22, 23 which enable the lateral movement of the container handling vehicle 9, i.e. the movement in the X and Y directions. In FIG. 2, two wheels in each set are visible. The first set of wheels 22 is arranged to engage with two adjacent rails of the first set 10 of rails, and the second set of wheels 23 arranged to engage with two adjacent rails of the second set 11 of rails. One of the set of wheels 22, 23 can be lifted and lowered, so that the first set of wheels 22 and/or the second set of wheels 23 can be engaged with their respective set of rails 10, 11 at any one time.

Each container handling vehicle 9 also comprises a lifting device 18 (not shown in FIGS. 1 and 2a, but visible in FIG. 2b) for vertical transportation of storage containers 6, e.g. raising a storage container 6 from and lowering a storage container 6 into a storage column 5. The lifting device 18 comprises a lifting frame (not shown in FIG. 2a, but similar to the one shown in FIG. 2b labelled 17) which is adapted to engage a storage container 6, which lifting frame can be lowered from the vehicle body 13 so that the position of the lifting frame with respect to the vehicle body 13 can be adjusted in a third direction Z, which is orthogonal the first direction X and the second direction Y.

Conventionally, and for the purpose of this application, Z=1 identifies the uppermost layer of the grid 4, i.e. the layer immediately below the rail system 8 (in the present application, the rail system 8 is termed the top level of the grid), Z=2 is the second layer below the rail system 8, Z=3 is the third layer etc. In the embodiment disclosed in FIG. 1, Z=8 identifies the lowermost, bottom layer of the grid 4. Consequently, as an example and using the Cartesian coordinate system X, Y, Z indicated in FIG. 1, the storage container identified as 6' in FIG. 1 can be said to occupy grid location or cell X=10, Y=2, Z=3. The container handling vehicles 9 can be said to travel in layer Z=0 and each grid column 12 can be identified by its X and Y coordinates.

Each container handling vehicle 9 comprises a storage compartment or space for receiving and stowing a storage container 6 when transporting the storage container 6 across the grid 4. The storage space may comprise a cavity 21 arranged centrally within the vehicle body 13, e.g. as is described in WO2014/090684A1, the contents of which are incorporated herein by reference.

Alternatively, the container handling vehicles may have a cantilever construction, as is described in NO317366, the contents of which are also incorporated herein by reference.

The single cell container handling vehicles 9 may have a footprint F, i.e. a horizontal periphery in the X and Y directions (see FIG. 4), which is generally equal to the lateral or horizontal extent of a grid column 12, i.e. the periphery/circumference of a grid column 12 in the X and Y directions, e.g. as described in WO2015/193278A1, the contents of which are incorporated herein by reference. Alternatively, the container handling vehicles 9 may have a footprint which is larger than the lateral extent of a grid column 12, e.g. as disclosed in WO2014/090684A1.

The rail system 8 may be a single-track system, as shown in FIG. 3. Preferably, the rail system 8 is a double-track system, as shown in FIG. 4, thus allowing a container handling vehicle 9 having a footprint F generally corresponding to the lateral extent of a grid column 12 to travel along a row of grid columns in either an X or Y direction even if another container handling vehicle 9 is positioned above a grid column 12 adjacent to that row.

In a storage grid, a majority of the grid columns 12 are storage columns 5, i.e. grid columns where storage containers are stored in stacks. However, a grid normally has at least one grid column 12 which is used not for storing storage containers, but which comprises a location where the container handling vehicles can drop off and/or pick up storage containers so that they can be transported to an access station where the storage containers 6 can be accessed from outside of the grid or transferred out of or into the grid, i.e. a container handling station. Within the art, such a location is normally referred to as a "port" and the grid column in which the port is located may be referred to as a port column.

The grid 4 in FIG. 1 comprises two port columns 19 and 20. The first port column 19 may for example be a dedicated drop-off port column where the container handling vehicles 9 can drop off storage containers to be transported to an access or a transfer station (not shown), and the second port 20 column may be a dedicated pick-up port column where the container handling vehicles 9 can pick up storage containers that have been transported to the grid 4 from an access or a transfer station.

When a storage container 6 stored in the grid 4 disclosed in FIG. 1 is to be accessed, one of the container handling vehicles 9 is instructed to retrieve the target storage container from its position in the grid 4 and transport it to the drop-off port 19. This operation involves moving the container handling vehicle 9 to a grid location above the storage column 5 in which the target storage container is positioned, retrieving the storage container 6 from the storage column 5 using the container handling vehicle's lifting device (not shown, being internally arranged in a central cavity of the vehicle, but similar to the lifting device 18 of the second prior art vehicle of FIG. 2b), and transporting the storage container to the drop-off port 19. A second prior art vehicle 9 is shown in FIG. 2b to better illustrate the general design of the lifting device. Details of the second vehicle 9 are described in the Norwegian patent NO317366. The lifting devices 18 of both prior art vehicles 9 comprise a set of lifting bands connected close to the corners of a lifting frame 17 (may also be termed a gripping device) for releasable connection to a storage container. To raise or lower the lifting frame 17 (and optionally a connected storage container 6), the lifting bands are spooled on/off at least one rotating lifting shaft or drum (not shown) arranged in the container handling vehicle. Various designs of the at least one lifting shaft are described in for instance WO2015/193278 A1 and PCT/EP2017/050195. The lifting frame 17 features container connecting elements for releasably connecting to a storage container, and guiding pins. If the target storage container is located deep within a stack 7, i.e. with one or a plurality of other storage containers positioned above the target storage container, the operation also involves temporarily moving the above-positioned storage containers prior to lifting the target storage container from the storage column. This step, which is sometimes referred to as "digging" within the art, may be performed with the same container handling vehicle that is subsequently used for transporting the target storage container to the drop-off port 19, or with one or a plurality of other cooperating container handling vehicles. Alternatively, or in addition, the automated storage and retrieval system may have container handling vehicles specifically dedicated to the task of temporarily removing storage containers from a storage column. Once the target storage container has been removed from the storage column, the temporarily removed storage containers can be repositioned into the original storage column. However, the removed storage containers may alternatively be relocated to other storage columns.

When a storage container 6 is to be stored in the grid 4, one of the container handling vehicles 9 is instructed to pick up the storage container from the pick-up port 20 and transport it to a grid location above the storage column 5 where it is to be stored. After any storage containers positioned at or above the target position within the storage column stack have been removed, the container handling vehicle 9 positions the storage container at the desired position. The removed storage containers may then be lowered back into the storage column, or relocated to other storage columns.

For monitoring and controlling the automated storage and retrieval system, e.g. monitoring and controlling the location of respective storage containers within the grid 4, the content of each storage container 6 and the movement of the container handling vehicles 9 so that a desired storage container can be delivered to the desired location at the desired time without the container handling vehicles 9 colliding with each other, the automated storage and retrieval system comprises a control system, which typically is computerised and comprises a database for keeping track of the storage containers.

The prior art solutions include i.a. so-called single cell robots. The single cell robots have its batteries arranged in the upper part of the robot above the space for receiving storage containers. This results in a relatively high center of gravity for the robot and increased challenges with regards to stability if the batteries were to be replaced by larger and heavier batteries.

Consequently, the prior art solution has drawbacks in relation to stability of the robots if the batteries were to be replaced with larger batteries.

In view of the above, it is desirable to provide a container handling vehicle, an automated storage and retrieval system comprising said container handling vehicle, that solve or at least mitigate one or more of the aforementioned problems related to the robots.

In particular, it is an objective of the present invention to provide a robot with improved operation time without reducing stability of the robot.

SUMMARY OF THE INVENTION

The invention is defined by the appended claims and in the following:

In a first aspect, the present invention provides a container handling vehicle for picking up storage containers from a three-dimensional grid of an underlying storage system, comprising
- a first set of wheels arranged at opposite portions of a vehicle body, for moving the vehicle along a first direction (X) on a rail system in the grid; and
- a second set of wheels arranged at opposite portions of the vehicle body, for moving the vehicle along a second direction (Y) on the rail system in the grid, the second direction (Y) being perpendicular to the first direction (X); wherein
- the vehicle body comprises walls (i.e. vertical or substantially vertical walls) on all sides and has a quadrilateral/four-sided footprint, wherein
- a first section and a second section are arranged side-by-side such that a centre point of the first section is arranged off centre relative a centre point of the footprint of the vehicle body, and
- wherein a size ratio of a footprint of the first section relative a footprint of the second section is at least 2:1, and wherein
- the first section is configured to accommodate a storage container, and
- the second section comprises at least a first battery.

The feature of arranging the at least first battery in the second section provides for an improved overall stability of the container handling vehicle in that the center of gravity is lower compared to prior art single cell robots. Normally, the storage containers have a rectangular shape in the X and Y directions and the prior art single cell robots have a rectangular footprint corresponding to the cross-sectional shape of the storage containers (somewhat larger in X and Y directions due to vehicle walls and wheels). The container handling vehicle according to one embodiment has a substantially quadratic footprint (i.e. square) which is more stable than the rectangular footprint of the prior art single cell robots.

The term wall shall be understood as a structural element of any relatively rigid material, such as but not limited to metal or plastic. It may be beneficial in terms of providing a reasonable amount of enclosure for the first section (with vents to allow air to exhaust as the storage container is accommodated). The second section is preferable more open to allow necessary cooling to the batteries and motors. Some form of impact protection may be beneficial covering the second section but a grille or mesh, or bars of a frame may be sufficient for those purposes. The walls of the second section need not extend all the way down to the wheels.

In an embodiment of the container handling vehicle, the at least first battery is fixed.

In an embodiment of the container handling vehicle, the at least first battery is exchangeable.

In an embodiment, the container handling vehicle further comprises a lifting device arranged at an upper level of the first section and wherein the at least first battery is arranged at or below the level of at least parts of the lifting device. This improves the stability of the vehicle due to a lower center of gravity compared to prior art single cell robots having batteries arranged above the lifting device.

In an embodiment of the container handling vehicle, the first set of wheels is displaceable in a vertical direction between a first position, wherein the first set of wheels allow movement of the vehicle along the first direction X, and a second position, wherein the second set of wheels allow movement of the vehicle along the second direction Y.

In an embodiment of the container handling vehicle, the first section has a rectangular footprint where two of the sides are longer than the two other sides, and wherein the second section is adjacent a long side of the first section.

In an embodiment of the container handling vehicle, the first section accommodates a first, second, third and fourth wheel of the first set of wheels and a first and second wheel of the second set of wheels, and the second section accommodates a third and fourth wheel of the second set of wheels.

In an embodiment of the container handling vehicle, the first section accommodates a first and third wheel of the first set of wheels and a first and second wheel of the second set of wheels, and the second section accommodates a second and a fourth wheel of the first set of wheels and a third and a fourth wheel of the second set of wheels.

In an embodiment of the container handling vehicle, the first section comprises four corners, and the rims of the first, second, third and fourth wheels of the first set of wheels and the first and second wheels of the second set of wheels are arranged at the corners of the first section.

In an embodiment of the container handling vehicle, the at least one first motor comprises a hub motor for each of the first and fourth wheel of the first set of wheels, and the at least one second motor comprises a hub motor for each of the third and fourth wheel in the second set of wheels. In other words, each of the first and fourth wheel of the first set of wheels, and each of the third and fourth wheel in the second set of wheels, is driven by a separate/dedicated hub motor. In one embodiment, the hub motors are arranged in or extend into the second section.

In an embodiment of the container handling vehicle, the first section comprises four corners, and the outer rim of the first, second, third and fourth wheels of the first set of wheels and the first and second wheels of the second set of wheels are arranged at or near each corner of the first section.

The wheels may be arranged on an inside of a wall defining the first and second sections, respectively, on an outside of the wall defining the first and second sections, or within the wall defining the first and second sections (e.g. within a recess or cutaway). The wall can be outermost walls or the wall forming the internal intersection or divider element between the first and second section. I.e. some of the wheels are supported by the internal divider element and can be arranged in the first section, the second section or inside the wall of the divider element.

In an embodiment of the container handling vehicle, the container handling vehicle may further comprise at least a second battery arranged in the second section above or below the first battery. Preferably, the second battery is arranged at a level below the first battery, i.e. such that both batteries are at a level below the upper level of the first section.

In an embodiment of the container handling vehicle, the first and fourth wheel of the first set of wheels, and the third and fourth wheel of the second set of wheels, are arranged within a downward projection area from the at least first battery, wherein the downward projection area represents the downward loads of the at least first battery.

The downward projection area of the at least first battery is preferably larger than the horizontal cross-sectional area of the at least first battery, but may also be substantially equal to the horizontal cross-sectional area of the at least first battery.

This result in that the wheels do not have to be arranged directly vertically below the at least first battery but can also be arranged horizontally offset relative the at least first battery. This will be the case in situations where the at least first battery is not occupying a whole cross-sectional area of the second section.

Preferably, the first and fourth wheel of the first set of wheels, and the third and fourth wheel of the second set of wheels (i.e. the at least four wheels in, or in connection with, the second section), are arranged such that at least some of the load(s) from the at least first battery is applied to each of said four wheels in, or in connection with, the second section. Preferable, the mutual relationship between the at least first battery and the four wheels in, or in connection with, the second section is such that a weight from the at least first battery is at least distributed to the four wheels arranged in, or close to or in connection with, the second section. The arrangement of the at least first battery and the wheels may be such that the weight is substantially evenly distributed to the four wheels. As such, there is less risk of spinning of the wheels as the ground pressure of the wheels on the rail system is increased. Preferably, a major part of the weight (e.g. more than 80% or more than 90%), of the at least first battery (and the second battery) is distributed to the four wheels in, or in connection with, the second section.

In an embodiment of the container handling vehicle, the at least four wheels in, or in connection with, the second section are arranged substantially vertically below the at least first battery.

In an embodiment of the container handling vehicle, the container handling vehicle further comprises an exchangeable battery arranged in the first section.

The wheels may be arranged with its own motor drive, for example an in-wheel motor drive or hub motor.

In an embodiment of the container handling vehicle, the second section comprises an assembly or collection of motors comprising a first motor for driving at least one wheel of the first set of wheels and a second motor for driving at least one motor of the second set of wheels. The first and second motors can be operated independently or jointly.

The footprint of the first section can be equal to the size of an underlying grid cell, and the second section is a protruding section which extends horizontally beyond the footprint of the first section.

A grid cell may be defined as the cross-sectional area, including the rails (when the rails are single-track rails), between opposed rails running in the X direction and opposed rails running in the Y direction.

A grid cell opening may be defined as the open cross-sectional area between two opposed rails running in the X direction and two opposed rails running in the Y direction.

The footprint of the second section is less than half the size the footprint of the first section (size ratio less than 1:2 relative the first section). When the container handling vehicle is positioned above a grid cell in a position where it can lift or lower a storage container into or out of the first section, the second section extends into a neighboring grid cell. However, the footprint of the vehicle body is less than 1.5 cells (in the Y-direction) and maximum one grid cell wide in the other direction (X-direction). In other words, the lateral extent of the container handling vehicle in the first direction corresponds to the lateral extent of the tracks in one cell, and maximum 1.5 grid cells in the direction perpendicular to the first direction. Consequently, in an example system for storing and retrieving storage containers, where two of the container handling vehicles described above are operated and are oriented in opposite directions, they occupy three grid cells when travelling in the first direction e.g. in the X-direction, whereas when travelling in the second direction e.g. in the Y-direction, they can travel along neighboring rows of grid cells occupying two grid cells.

The first section may have a footprint defined as a horizontal periphery in the X and Y directions (see FIG. 4), which is generally equal to the lateral or horizontal extent of a grid column 12, i.e. the periphery/circumference of a grid column 12 in the X and Y directions.

The second section may have a footprint defined by a horizontal extent of the container handling vehicle in the X and Y directions. The extent in the Y direction is maximum half the horizontal extent in the Y direction of the first section.

The first and second sets of wheels may comprise a first set of wheels for engaging with the first set of tracks to guide movement of the container handling vehicle in the first direction, and a second set of wheels for engaging with the second set of tracks to guide movement of the container handling vehicle in the second direction.

The first section of the container handling vehicle may comprise a cavity for accommodating a storage container and a lifting device arranged to transport a storage container vertically between a storage position in a stack and a transport position inside the cavity. The lifting device may comprise a gripping device being configured to releasably grip a storage container; and a lifting motor being configured to raise and lower the gripping device relative to the first section.

The second section, allows for the use of larger and stronger motors for driving the wheels arranged in the second section than what is possible in the prior art single cell robots. In addition, the second section makes it possible to provide only four of the wheels of the vehicle with larger/stronger motors, instead of providing all 8 wheels with weaker/smaller motors. It is not possible to use larger/stronger motors for the wheels arranged in the first section since the available space is very limited. The use of larger/stronger motors in the first section would either reduce the space available for receiving storage containers or require an increased footprint of the first section, i.e. the footprint of the first section would cover more than one storage column. The possibility of using larger/stronger motors allows for the provision of container-handling vehicles having an improved acceleration and/or speed. It is noted that similar to the first section, it is difficult, and maybe even impossible, to provide prior art single cell vehicles with larger/stronger motors without increasing their footprint or decreasing the space available for accommodating a container.

Furthermore, utilizing larger motors on the motors in the second section minimizes, and may in some situations even eliminate, the need for motors on the wheels in the first section. Thus, it is possible to provide a container handling vehicle with only four wheel motors in total, where each motor is arranged in the second section, and where two of the wheel motors drive wheels running in the X direction and two of the motors drive wheels running in the Y direction. The remaining four wheels is then passive (not motor driven). Alternatively, the remaining four wheels comprises in-wheel motors.

By having the more powerful wheel motors arranged in the second section, a major part of the load/weight of the overlying battery(ies) will push or force the most powerful drive wheels downwards, thus reducing the risk of wheel spin by increasing the ground pressure of the wheels on the rail system.

In other situations, if the wheel motors are strong enough alone and the demand for high speed/acceleration is limited, it may be enough with two wheel motors in the container handling vehicle total. Then the two wheel motors are arranged in the second section, where one motor drives a wheel in the X direction and another motor drives a wheel in the Y direction. Then the remaining six wheels are passive (not motor driven) or comprises in-wheel motors.

Motors arranged in the second section have a short distance between them. Due to the short distance between the motors, fewer, e.g. one BrushLess Direct Current (BLDC) card, may be required instead of four BLDC cards in the prior art single cell robots. In the prior art solutions, the distance between the motors driving the wheels in the container handling vehicle is of such an extent that typically four BLDC cards are required. The cost of BLDC cards is quite high. However, as the distance between the motors can be substantially reduced by arranging the motors in the second section, the overall cost for the container handling vehicle can be reduced because fewer BLDC cards (e.g. only one BLDC card) is required.

The first section and the second section may be fully separated by a physical barrier(s) at the intersection between the first and second sections, such as a wall or plate or similar. Alternatively, the first and second section may be partially separated at the intersection between the first and second section, for example by providing a barrier or member that extends across only a part or parts of the intersection. Such a partly separation may be in the form of a connection plate, beam, rod or similar in a lower part of the vehicle body, to which connection plate, beam, rod or similar at least one set of wheels and battery and possibly motor(s) can be connected.

The container handling vehicle further provides more available space for track sensors. Track sensors are usually arranged in the space between wheels for detecting the position of the container handling vehicle by integrating tracking devices tracking the number of crossings passed in X- and Y-directions relative to the tracks laid out as a grid structure. A method of detecting position may comprise tracking the position of a remotely operated vehicle following a set route relative to tracks laid out on a frame structure forming a grid, the vehicle having first and second sets of wheels connected to drives for moving the vehicle in corresponding X- and Y-directions on the rail system in the grid, the method comprising receiving information of the number of track crossings to pass between start and stop positions in X- and Y-directions according to the set route; directing sensors attached to the vehicle at the tracks along the route of the vehicle; detecting and monitoring track crossings passed when moving the vehicle in the X- and Y-directions according to the set route; transmitting a signal to a controller, controlling the drives of the wheels of the vehicle, when the number of track crossings passed is close to the total number of track crossings to pass between the start and stop positions in respective X- and Y-directions along the set route.

In an embodiment of the container handling vehicle, each of two pairs of opposed wheels in the first set of wheels and each of two pairs of opposed wheels in the second set of wheels, forms an imaginary rotational axis therebetween, and wherein
  one of the rotational axes formed by the wheels in the first set of wheels intersects with both rotational axes in the second set of wheels, and
  another of the imaginary rotational axes formed by the wheels in the first set of wheels does not intersect any of the rotational axes in the second set of wheels.

In an embodiment of the container handling vehicle, the size of the first section corresponds to a grid cell of a rail system of an underlying storage and retrieval system, and wherein, during use, when the container handling vehicle is in a position to lift or lower a storage container, the second section is horizontally displaced relative the grid cell and extends partly into (i.e. over) a neighboring grid cell. I.e. the at least first battery arranged in the second section is arranged outside the grid cell occupied by the first section.

In an embodiment of the container handling vehicle, each of two pairs of opposed wheels in the first set of wheels and each of two pairs of opposed wheels in the second set of wheels, forms imaginary rotational axis therebetween, and wherein
  one of the rotational axes formed by the wheels in the first set of wheels intersects with both rotational axes in the second set of wheels, and
  another of the imaginary rotational axes formed by the wheels in the first set of wheels does not intersect any of the imaginary rotational axes in the second set of wheels.

In an embodiment of the container handling vehicle, the first and second sets of wheels are arranged at or within a lateral extent of the vehicle body.

In a second aspect, the present invention provides an automated storage and retrieval system comprising a three-dimensional grid and at least one container handling vehicle, the grid comprises a rail system, on which the container handling vehicle may move, and a plurality of stacks of storage containers;
  the rail system comprises a first set of parallel tracks arranged in a horizontal plane P and extending in a first direction X, and a second set of parallel tracks arranged in the horizontal plane and extending in a second direction which is orthogonal to the first direction X, wherein the first and second sets of tracks form a grid pattern in the horizontal plane P comprising a plurality of adjacent grid cells, each grid cell comprising a grid opening defined by a pair of opposed tracks of the first set of tracks and a pair of opposed tracks of the second set of tracks;
  the plurality of stacks of storage containers are arranged in storage columns located beneath the rail system, wherein each storage column is located vertically below a grid opening;
  the container handling vehicle features a vehicle body comprising substantially vertical walls on all sides forming a footprint defined by horizontal peripheries in the X and Y directions of the vehicle body, and a first section and a second section arranged side-by-side;
  the first section is configured to accommodate a storage container; and
  the second section comprises at least a first battery for driving at least one wheel of each of the sets of wheels, wherein
  a footprint of the first section is substantially equal to a grid cell defined by a cross-sectional area, including width of the tracks, between a pair of opposed tracks of the first set of tracks and a pair of opposed tracks of the second set of tracks, and the second section extends partially into a neighboring grid opening when the first section is positioned over an adjacent grid opening.

In an embodiment of the automated storage and retrieval system, an extent of the footprint FV of the container handling vehicle in the X direction, LX, and Y direction, LY, is:
  LX=1.0 grid cell in the X direction, and
  1<LY<1.5 grid cells in the Y direction,
wherein a grid cell is defined as the cross-sectional area, including width of the tracks, between two opposed rails running in the X direction and two opposed rails running in the Y direction.

In an embodiment of the automated storage and retrieval system, the second section extends less than 50% into the neighboring grid opening, i.e. the footprint FV of the container handling vehicle may extend over one grid opening in the X direction and maximum 1.5 grid openings in the Y direction.

The container handling vehicle in the storage system according to the second aspect may comprise any of the features of the container handling vehicle of the first aspect.

In an aspect, the first, second and any additional motors comprises a brushless DC motor. Various types of brushless DC motors are known, including permanent magnet synchronous motor (using permanent magnets) and switched reluctance motors (does not use any permanent magnets).

The working principles of the permanent magnet synchronous brushless DC motor is known to the skilled person, e.g. as described in https://en.wikipedia.org/wiki/Brushless_DC_ electric_motor, and typically uses one or more permanent magnets in the rotor and electromagnets on the motor housing for the stator. A motor controller converts DC to AC. This design is mechanically simpler than that of brushed motors because it eliminates the complication of transferring power from outside the motor to the spinning rotor. The motor controller can sense the rotor's position via Hall effect sensors or similar devices and can precisely control the timing, phase, etc., of the current in the rotor coils to optimize torque, conserve power, regulate speed, and even apply some braking.

The working principles of switched reluctance motors are known to the skilled person and are described in for instance Jin-Woo Ahn (2011), Switched Reluctance Motor, Torque Control, Prof. Moulay Tahar Lamchich (Ed.), ISBN: 978-953-307-428-3, InTech, available from: http://cdn.intechweb.org/pdfs/13717.pdf and in R. Krishnan (2001), Switched reluctance motor drives: Modelling, Simulation, Analysis, Design and Applications; CRC Press.

In an aspect, the at least one motor comprises a rotary electrical motor converting direct current electrical energy into rotational energy of the at least first or second lifting shafts.

In an aspect, the at least one motor is a permanent magnet brushless DC motor, where the motor comprises a stator arranged radially between rotor magnets (on the radial outside of the stator). The stator may be fixed to a stator housing, which stator housing is connected to a housing of the container handling vehicle. The rotor magnets may be arranged on an inside of a wheel rim surrounding the stators and can be connected to rotate with the wheels. The stator(s) then rotates the rotor magnets and thereby the wheels. The stator may, e.g. be arranged at least partly, preferably fully, within the same rotational plane as a motor housing and at least partly, preferably fully, within the container vehicle body. The term "rotational plane" signifies in this embodiment the plane extending perpendicular from the rotational axis of the wheels. Said stators include both windings and yoke, and the stator field windings are following the outer periphery of wheel rim where the rotor magnets are arranged.

In an aspect, the electric motor may be a reluctance motor with similar working principles as the permanent magnet brushless DC motor described above, for instance a switched reluctance motor, comprising a stator element with multiple stator poles and a rotor element featuring multiple rotor poles, connected to, or being part of, a drive shaft where one of the wheels is the rotor element, or forms part of the rotor element. The rotor element (or drive shaft) of the reluctance motor may be aligned with the centerline of the wheel or comprise a part of one end of the wheel. Alternatively, the stator element can be arranged within the rotor element (or vice versa), and the rotor element may be arranged within the wheel, as a part of, or operationally connected to, said wheel. This latter solution will free a maximum amount of space within the cavity of the vehicle body.

In the following, numerous specific details are introduced by way of example only to provide a thorough understanding of embodiments of the invention. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

In the present disclosure relative terms such as upper, lower, lateral, vertical, X-direction, Y-direction, Z-direction, etc., shall be interpreted using the above mentioned prior art storage system (FIG. 1) as reference system. Therefore, the feature lateral in relation to the extension in the X-direction and Y-direction of the vehicle shall be understood to be the extension of the vehicle in the X-direction and Y-direction, e.g. the footprint of the vehicle in the X-direction and Y-direction.

SHORT DESCRIPTION OF THE DRAWINGS

Certain embodiments of the present invention will now be described in detail by way of example only and with reference to the following drawings:

FIGS. 2A and 2B, 2C depict two different prior art container handling vehicles.

FIG. 5A is a perspective side view of a lifting device which can be mounted in a container handling vehicle;

FIGS. 5B, 5C, 5D show the footprints of the container handling vehicle FV, the first section F1 and the second section F2, where the footprint is shown by the shaded area, respectively;

FIG. 10A is a side view of a container handling vehicle where the covers are removed, the container handling vehicle has an exchangeable battery arranged inside a battery receiving unit in an upper portion of the container handling vehicle;

FIG. 10B is another view of the container handling vehicle of FIG. 10A, where it is disclosed a motor assembly comprising a lifting device motor arranged in the second section;

FIG. 10C is another view of FIG. 10A, where it is disclosed a first battery and a second battery in the second section;

FIG. 10D is a view from below of FIG. 10C;

FIG. 10E shows an example of container handling vehicle with a first battery with a lateral extension in the X and Y direction substantially equal to the lateral extension of an inner cross-sectional area of the second section;

FIG. 11C is another side view of FIG. 11A, showing a gap between the two container handling vehicles passing each other in the X direction of the rail system;

FIG. 11D is an underside view of two container handling vehicles passing each other;

Figure 1:
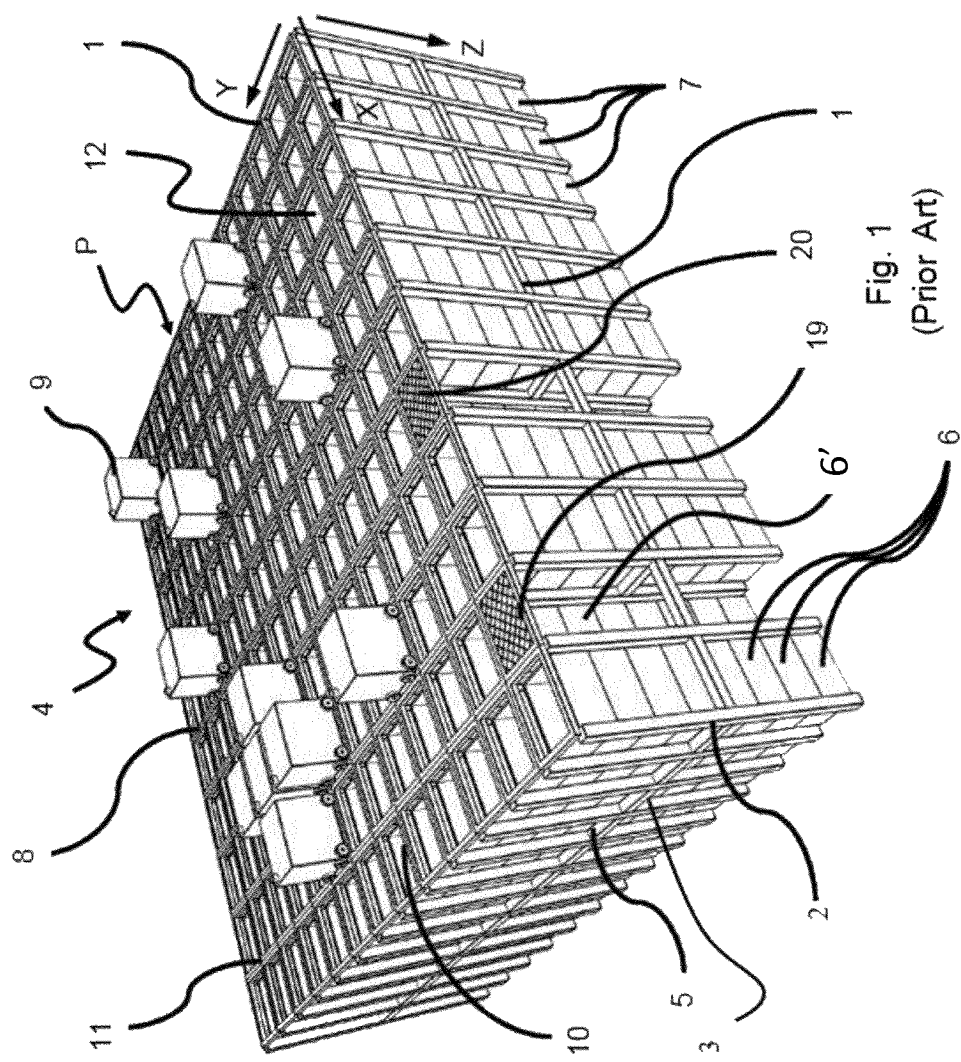
FIG. 1 is a perspective side view of a prior art storage and retrieval system.

FIGS. 12A-C show differences in the center of gravity of the storage containers inside the storage container cavity relative the center of the footprint of the vehicle body, where FIG. 12A illustrates a prior art single cell robot, FIG. 12B is a prior art central cavity robot, and FIG. 12C shows the container handling vehicle according to the present invention;

FIGS. 13A-C show differences in imaginary lines extending between opposed wheels of the same sets of wheels, and which of said lines which intersect or not intersect imaginary lines between other wheels, where FIG. 13A illustrates a prior art single cell robot, FIG. 13B is a prior art central cavity robot, and FIG. 13C shows the container handling vehicle according to the present invention;

In the drawings, like reference numbers have been used to indicate like parts, elements or features unless otherwise explicitly stated or implicitly understood from the context.

DETAILED DESCRIPTION OF THE INVENTION

In the following, embodiments of the invention will be discussed in more detail by way of example only and with reference to the appended drawings. It should be understood, however, that the drawings are not intended to limit the invention to the subject-matter depicted in the drawings and that features described in one drawing are not necessarily dependent on presence of other features of the same drawing but can be combined with features from other drawings.

Figure 3:
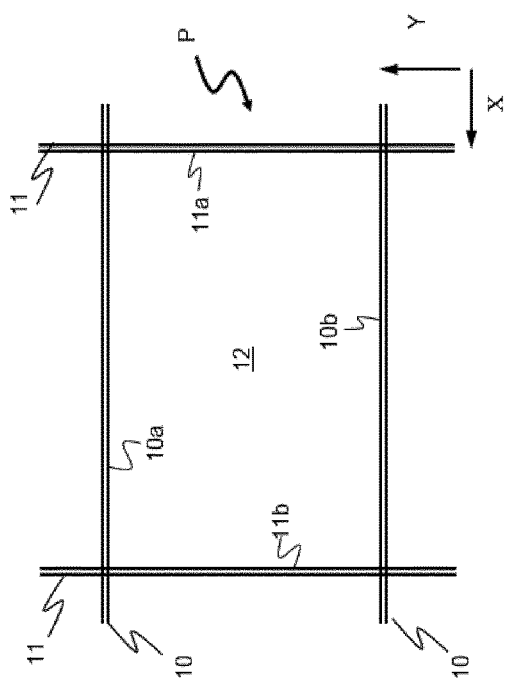
FIGS. 3 and 4A are top side schematic views of two types of rail systems for use in the storage system in FIG. 1.
Figure 4B:
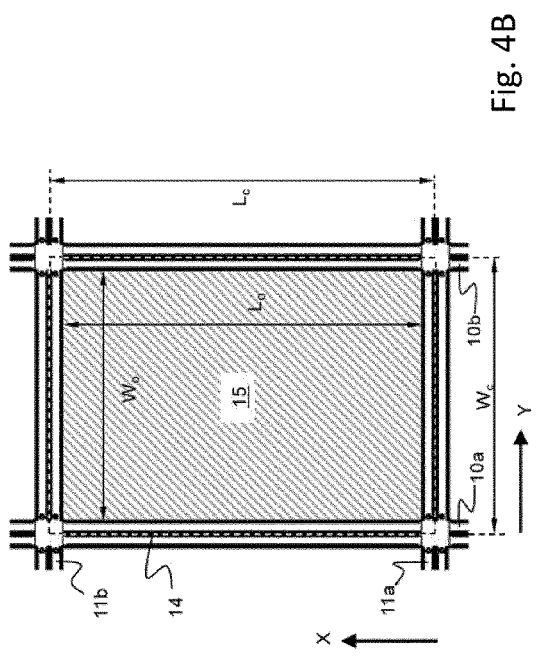
FIGS. 4B and 4C are top views of two different track systems of the automated storage and retrieval systems.
Figure 4A:
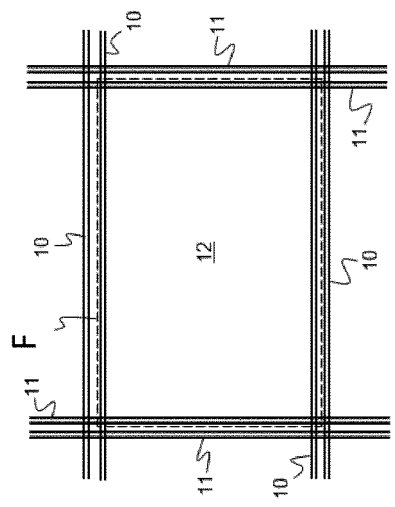
Figure 4C:
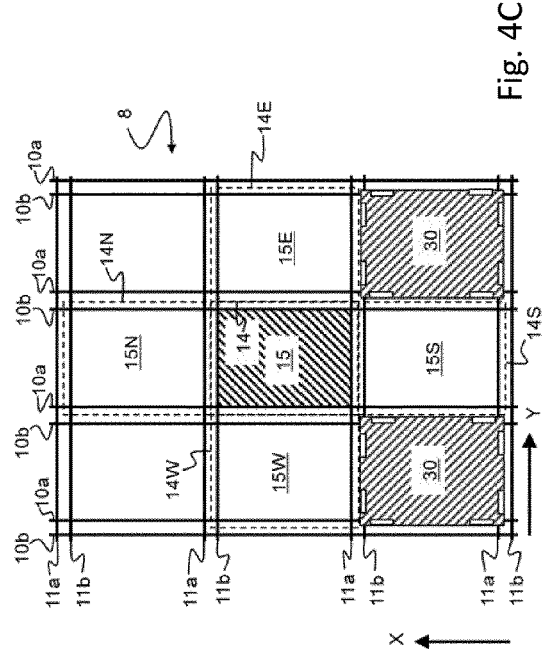

Referring to FIGS. 3 to 4C, top views of two different rail systems of the automated storage and retrieval systems are shown.

The rail system forms a grid structure or grid pattern in the horizontal plane P, see FIG. 1. The grid 4 comprises a plurality of rectangular and uniform grid locations or grid cells 14 (see FIG. 4B), where each grid cell 14 comprises a grid opening 15 (i.e. the upper end of a storage column 12) which is delimited by a pair of opposed rails 10a, 10b of a first set of tracks and a pair of opposed rails 11a, 11b of a second set of tracks. The rails 10a,10b,11a,11b form a rail system 8 on which the container handling vehicle(s) 9' operate. In FIG. 4B, the grid cell 14 is indicated by a dashed box and the grid opening 15 is indicated by a hatched area.

Consequently, pairs of opposed rails 10a and 10b define parallel rows of grid cells running in the X direction, and pairs of opposed rails 11a and 11b extending perpendicular to rails 10a and 10b define parallel rows of grid cells running in the Y direction.

Each grid cell 14 has a width $W_c$ which is typically within the interval of 30 to 150 cm, and a length $L_c$ which is typically within the interval of 50 to 200 cm. Each grid cell 14 may be rectangular as shown such that $W_c<L_c$. Each grid opening 15 has a width $W_o$ and a length $L_o$ which is typically 2 to 10 cm less than the width $W_c$, and the length $L_c$, respectively, of the grid cell 14. This difference between $W_c$ and $W_o$ and between $L_c$ and $L_o$ corresponds to the width (i.e. the width of a set of tracks) of two opposed rails 10a,10b, 11a,11b or, in effect, the width of a double-track rail since the grid cell extends to the midpoint of such a double-track rail (i.e. a double-track rail comprising 10a and 10b or 11a and 11b).

The double-track rail may be profiled to provide two parallel channels for the wheels of the container handling vehicle to run in.

FIG. 3 shows a prior art rail system featuring single-track rails 10, 11. When such a rail system is used, two container-handling vehicles are not allowed to pass each other at adjacent grid cells 14.

Where a single-track rail is used in one of the directions, then the boundary of the grid cell extends to the side of the track on the opposite side of the grid opening to the one being worked (neighboring grid cells will overlap by this track width in a similar way).

The rail system shown in FIGS. 4B and 4C, features horizontal double-track rails. Consequently, each rail is capable of accommodating two wheels in parallel. In such a rail system, the borders between neighboring grid cells 14 run along the centre-line of the horizontal rails, as is indicated in FIG. 4B.

In FIG. 4C, grid cell 14, in the middle of the section of the illustrated grid system, comprises a grid opening/grid cell opening 15. To the left (West) of grid cell 14, there is an adjacent grid cell 14W comprising a grid opening 15W. Likewise, to the right (East) of grid cell 14, there is an adjacent grid cell 14E comprising a grid opening 15E. Also, below grid cell 14 (South), there is an adjacent grid cell 14S comprising a grid opening 15S, and above grid cell 14 (North), there is an adjacent grid cell 14N comprising a grid opening 15N.

In FIG. 4C, a footprint 30 of a prior art container handling vehicle is schematically illustrated. In this embodiment the footprint 30 is defined by the horizontal extent of the wheels of the vehicle. As is evident from the figure, the footprint 30 has a horizontal extent which is less than the horizontal extent of a grid cell.

FIG. 5A is a perspective side view of parts of a lifting device 18 which can be mounted in a container handling vehicle and a container 6 to be lifted by the lifting device. The lifting device comprises a lifting frame 17, which is commonly connected to at least one rotatable lifting shaft via lifting bands, the lifting shaft arranged at an upper level within a cavity of the container handling vehicle. FIG. 5B shows the footprint, i.e. the dashed area in the Figure denoted FV, of an exemplary container handling vehicle 9' according to the invention. The footprint FV is equal to the lateral extent of the container handling vehicle 9' in both directions. The container handling vehicle 9' consists of a first section 204 and a second section 205.

FIG. 5C shows the footprint of the first section 204, i.e. the dashed area in the Figure denoted F1. In the disclosed embodiment, the first section comprises a cavity for accommodating a storage bin 6 and a lifting device 18 as shown in FIG. 5A.

FIG. 5D shows the footprint of the second section 205, i.e. the dashed area in the Figure denoted F2. The wheels may be arranged on an inside of a wall defining the first and second sections, respectively, on an outside of the wall defining the first and second sections, or within the wall defining the first and second sections (e.g. within a recess or cutaway). The wall can be outermost walls or the wall forming the internal intersection or a divider element between the first and second section. I.e. some of the wheels are supported by the internal divider element and can be arranged in the first section, the second section or inside the wall of the divider element.

Figure 6B:
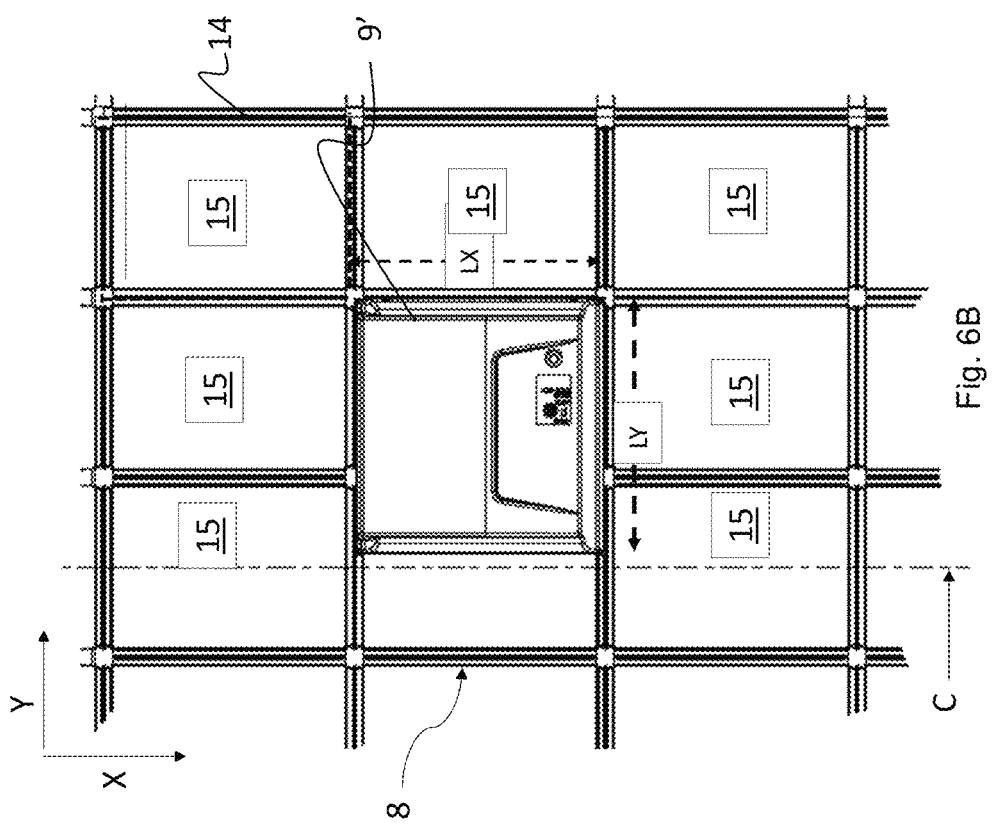
FIG. 6B is a top view of a container handling vehicle and illustrates the extension in the X- and Y directions of the container handling vehicle on a rail system.
Figure 6A:
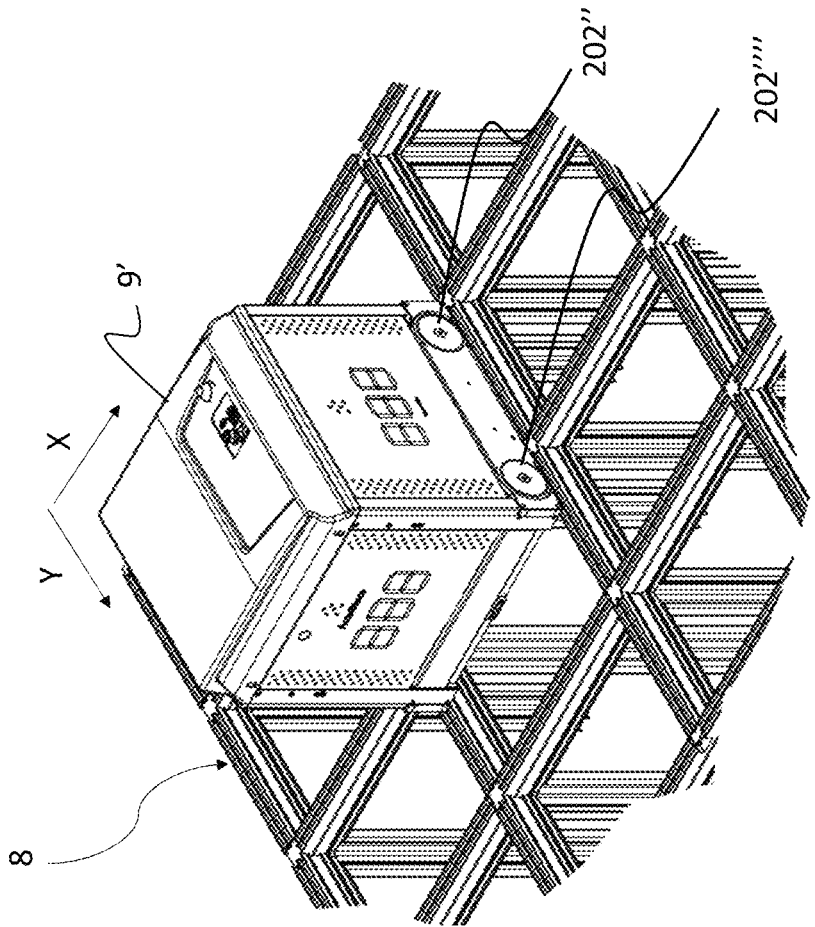
FIG. 6A is an angled side view from above of a container handling vehicle.

FIG. 6A is a perspective side view from above of a container handling vehicle 9'. The container handling vehicle 9' operates on a rail system 8, and is configured to move laterally in the X and Y directions indicated in the Figure. The X direction is perpendicular to the Y direction.

The vehicle 9' comprises a first set of wheels (not shown, see FIG. 8A) arranged at opposite portions of a vehicle body 13, for moving the vehicle 9' along a first direction X on a rail system 8 of a storage system 1, and a second set of wheels (only two of the wheels of the second set of wheels are shown, 202",202"") arranged at opposite portions of the vehicle body 13, for moving the vehicle 9' along a second direction Y on the rail system 8. The second direction Y is perpendicular to the first direction X. The first set of wheels is displaceable in a vertical direction Z between a first position and a second position. In the first position, the first set of wheels allow movement of the vehicle 9' along the first direction X, and in the second position, the second set of wheels allow movement of the vehicle 9' along the second direction Y. Structural details of suitable wheel displacement assemblies for providing displaceable sets of wheels are disclosed in for instance WO2015/193278 A1 and WO2017/153583, the contents of which are incorporated by reference.

FIG. 6B is a top view of a container handling vehicle 9' of FIG. 6A and illustrates the extent in the X and Y directions (LX and LY) of the container handling vehicle 9' on a rail system 8. The line C indicates a center line of the grid cell 14 and grid cell opening 15 in the Y direction. The footprint of the container handling vehicle 9' in the X direction (LX) is substantially equal to the dimension of the grid cell 14 in the X direction and the footprint of the container handling vehicle 9' in the Y direction (line LY) is larger than the dimension of the grid cell 14 in the Y direction such that part of the vehicle body extends over or into a neighboring cell (in the embodiment shown, this is a neighbouring cell to the left of the cell being worked). This extension of the vehicle body over or into the neighboring cell is of a size less than half the lateral extent in the Y direction of the grid cell opening in the neighboring cell, meaning that the length LY is more than 1.0 grid cell but less than 1.5 grid cells 14 in the Y direction (1.0<LY<1.5 grid cells).

When operating on a rail system 8 as shown in FIG. 6B with rectangular grid cells 14, the footprint of the container handling vehicle 9' is substantially square because the extent of the grid cell 14 is longer in the X direction than in the Y direction and the container handling vehicle occupies more than one grid cell 14 in the Y direction and only one grid cell 14 in the X direction. A substantially square footprint has the advantage that the overall stability of vehicle 9' is improved compared to prior art solutions displaying a more rectangular footprint often in combination with a relatively high center of gravity.

Figure 7:
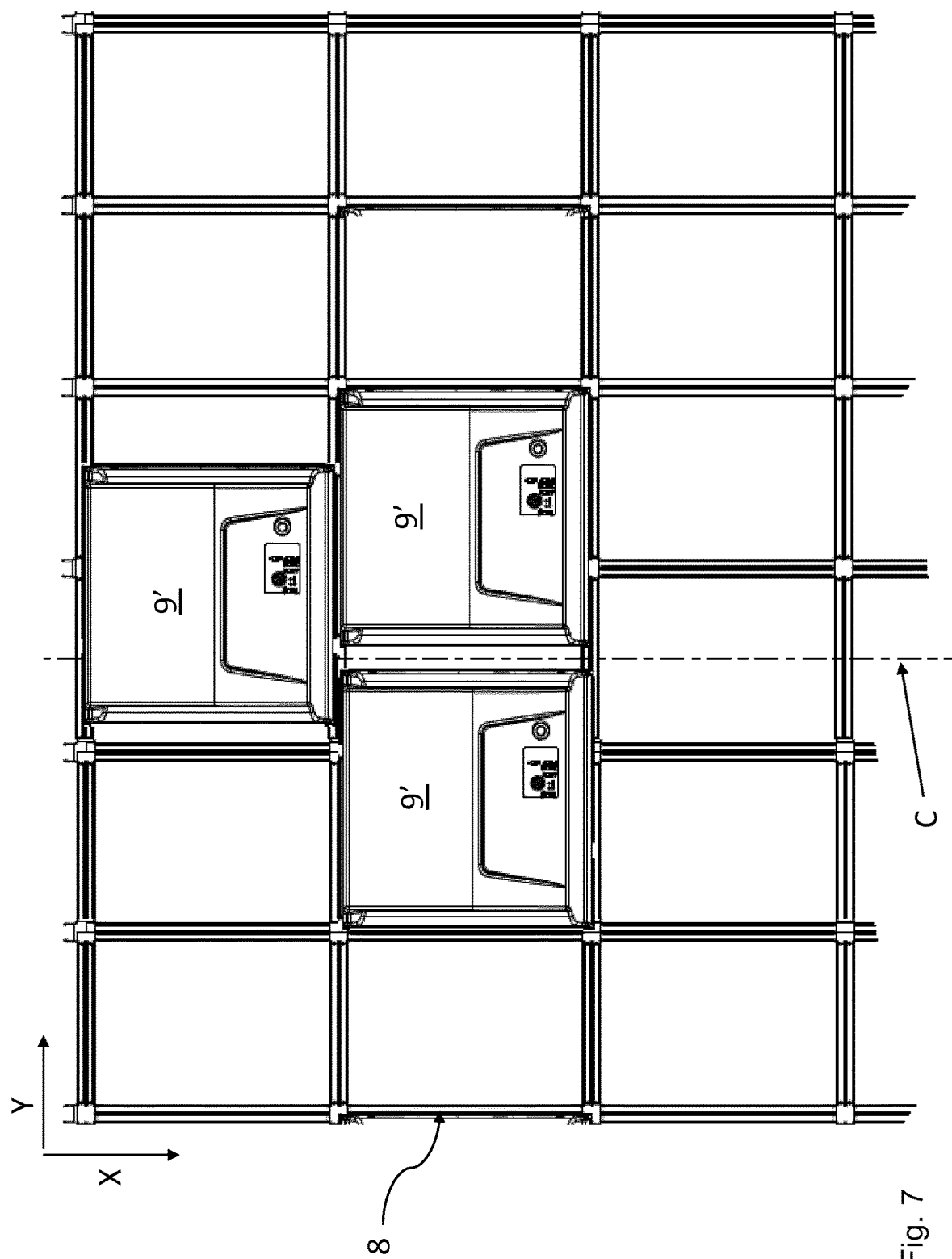
FIG. 7 is a top view of three container handling vehicles passing each other and operating on a rail system.

FIG. 7 is a top view of three similar container handling vehicles 9' oriented in the same direction, passing each other and operating on a rail system 8 featuring dual-track rails as discussed above. As shown in the Figure, the container handling vehicles 9' have a footprint corresponding to the dimension of the grid cell 14 in the X direction allowing other container handling vehicles 9' travelling in the Y direction, to pass in neighboring cells (the container handling vehicles 9' occupying two rows of the rail system 8 as they pass by each other) on both sides of the vehicle 9'. However, because the size of the overlap into the neighboring cell is less than half the lateral extent of the grid cell in the Y direction, similar container handling vehicles 9' travelling in the X direction can pass each other occupying three rows (provided that the container handling vehicle is arranged in counter configuration).

Figure 8:
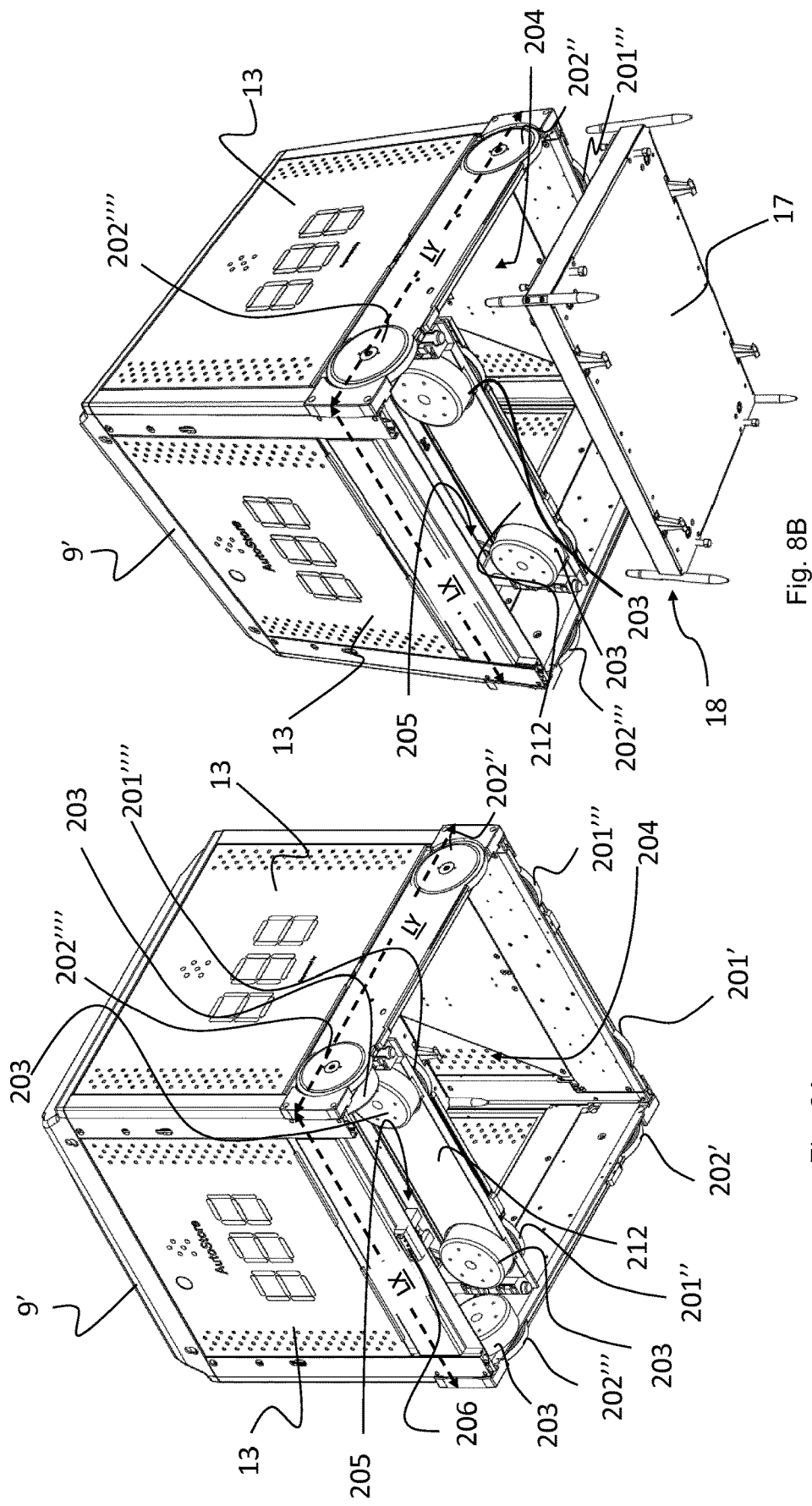
FIG. 8A is an angled view from below of an interior of the container handling vehicle with the lifting device in an upper position inside a first section.
FIG. 8B is an angled view from below of an interior of the container handling vehicle with the lifting device in a lower position extending downwardly from a first section.

The presence of the second section 205, makes it possible to utilize larger and stronger motors 203, see FIG. 8A, for driving the wheels than in the prior art single cell robot shown in FIG. 2A, while at the same time keeping many of the advantages of such a robot.

As disclosed in FIG. 8A, the first section 204 accommodates a first 201', second 201", third 201'" and fourth 201"" wheel of the first set of wheels and a first 202' and second 202" wheel of the second set of wheels, and the second section accommodates a third 202'" and fourth 202"" wheel of the second set of wheels. This particular wheel arrangement is highly advantageous as it allows for the use of more powerful wheel hub motors 203 for driving the second 201" and the fourth 201"" wheel of the first set of wheels as well as the third 202'" fourth 202"" wheel of the second set of wheels.

The second 201" and fourth 201"" wheel of the first set of wheels can be accommodated in the second section (not shown) provided the hub motors of said wheels are also arranged in the second section. To improve stability of the vehicle 9', the rim of the wheels 201', 201'", 202', 202", 202'", 202"" are preferably arranged at the corners of the vehicle 9'.

Figure 9:
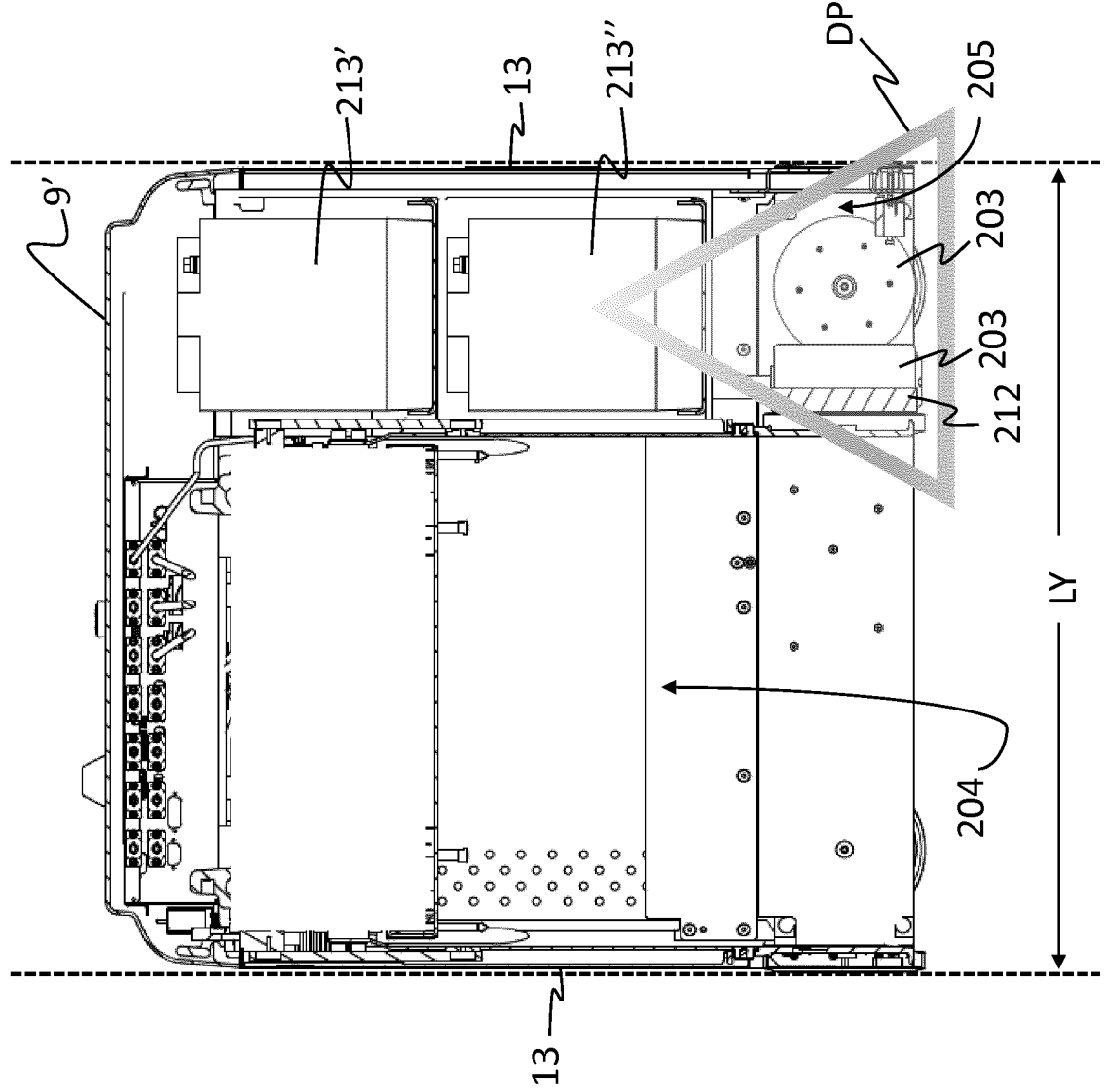
FIG. 9 is a side view of a container handling vehicle with two batteries arranged in a second section.

All of the wheels 201', 201", 201'", 201"", 202', 202", 202'", 202"" are preferably arranged inside the lateral extent LX, LY in the X and Y directions of the vehicle body 13 (see also description in relation to FIG. 9).

The first section 204 and the second section 205 may be fully separated by a physical barrier at the intersection between the first and second sections 204, 205, such as a wall or plate or similar. Alternatively, the first and second sections 204, 205 may be partly separated at the intersection between the first and second section 204, 205, for example by providing a barrier over parts of the intersection.

In FIG. 8A, the first and second section is separated by a wheel connecting element 212 (i.e. a connection plate or beam) to which the second 201" and the fourth 201"" wheel of the first set of wheels and their respective hub motors 203 are connected . . . . The wheel connecting element 212 is part of a wheel displacement assembly 214, such that the second 201" and the fourth 201"" wheel of the first set of wheels (together with the first 201' and the third 201" wheel of the first set of wheels) may be moved in a vertical direction.

In the disclosed embodiment, the second 201" and the fourth 201"" wheels are accommodated in the first section 204, while the hub motors 203 extend into the second section. In an alternative embodiment, both the second 201" and the fourth 201"" wheels, as well as the hub motors, may be accommodated in the second section 205.

It is noted that having the second 201" and the fourth 201"" wheel of the first set of wheels, as well as the third 202'" fourth 202"" wheel of the second set of wheels, arranged such that their hub motors 203 extend/protrude into the second section 205 allows for the use of more powerful motors than would be the case if the hub motors were arranged such that they would extend into the first section 204. The remaining wheels, i.e. the wheels not featuring a hub motor extending into the second section, may either be passive or motorized, for instance motorized by in-wheel hub motors as disclosed in WO 2016/120075 A1.

FIG. 8B is a perspective view from below of an interior of the container handling vehicle 9' showing the lifting frame 17 of the lifting device 18 in a lower position extending downwardly from the first section 204. The lifting device 18 may have similar features as the lifting device described in relation to FIGS. 2A and 2B.

FIG. 9 is a side view of a container handling vehicle with hub motors 203 and two batteries 213', 213" arranged in the second section 205. As is clear from e.g. FIG. 9, the exterior facing side of the wheels may in one aspect be arranged such that they are not extending outside the vehicle body 13 (indicated by the dotted lines on each side of the vehicle 9' in FIG. 9). For example, the exterior facing sides of the wheels in the lateral X and Y directions may be flush with the vehicle body 13. Although not shown in FIG. 9 (but in FIGS. 8A and 8B+6B), the same applies to the wheels in the opposite direction (X), i.e. those wheels may also be arranged such that they are not extending outside the vehicle body 13. The batteries can be any appropriate battery, such as, but not limited to, lithium battery(ies), conventional car battery(ies) (low cost) etc.

The vehicle body 13 includes any of the following elements, even if all are present or if some are missing, such as body frame, side cover panels or plates, wheel suspensions, housing for track sensors between the wheels etc. A rotating exterior surface of the wheels may thus be arranged in the same vertical plane as one of the walls in the vehicle body 13. Alternatively, the wheels may be arranged inside the vehicle body 13 such that the rotating exterior surfaces of the wheels can be laterally displaced relative a vertical plane formed by one of the walls in the vehicle body 13. In FIG. 6B, none of the wheels are visible in the top view, indicating that the outermost lateral parts of all wheels are arranged such that they are not extending outside the vehicle body 13.

The container handling vehicle 9' may be provided with an interface 206 (see FIG. 8A) for charging of the batteries 213', 213" in the container handling vehicle 9'.

At least four wheels are arranged within a downward projection area DP from the at least first battery 213', 213". The downward projection area DP may represent the downward loads of the at least first battery 213', 213".

As shown in FIG. 9, the downward projection area DP of the at least first battery 213', 213" is preferably larger than the horizontal cross-sectional area of the at least first battery, but may also be substantially equal to the horizontal cross-sectional area of the at least first battery. In other words, because the at least first battery is arranged in the second section the weight of the at least first battery will at least be distributed to the at least four wheels arranged in, or close to the second section, illustrated as the second wheel 201" and fourth wheel 201"" of the first set of wheels and the third wheel 202''' and the fourth wheel 202"" of the second set of wheels, i.e. the forces from the at least first battery remains generally within the wheelbase of the second wheel 201" and fourth wheel 201"" of the first set of wheels and the third wheel 202''' and the fourth wheel 202"" of the second set of wheels. However, the load of the battery may be partly distributed to all of the wheels, but the weight distributed to the wheels with the largest horizontal component will be less than the wheels with a smaller horizontal component relative the position of the at least first battery. This will push at least said wheels downwardly, resulting in increased stability, grip/friction against rails compared to prior art robots. Furthermore, this configuration has an additional effect if the DP area is the area where the centre of gravity falls to take into account any resultant forces from high speed or travel or hard acceleration/deceleration.

This result in that the wheels do not have to be arranged directly vertically below the at least first battery but can also be arranged horizontally offset relative the at least first battery. This will be the case in situations where the at least first battery is not occupying a whole cross-sectional area of the second section. The wheels span the area where the force from the at least first battery falls, taking into account the vehicle's movement, so that the vehicle remains stable.

Preferably, the at least four wheels are arranged such that at least some of the load(s) from the at least first battery is applied to each of the four wheels. Preferable, the mutual relationship between the at least first battery and the four wheels is such that a weight from the at least first battery is substantially evenly distributed to the four wheels.

FIG. 10A is a side view of a container handling vehicle where the covers are removed, the container handling vehicle has an exchangeable battery 208 arranged inside a battery receiving unit 209 in an upper portion of the container handling vehicle. It is further disclosed a controller unit 210 which communicates with the overall control system. The controller unit 210 may further accommodate a capacitor power supply (not shown). The capacitor power supply typically has the ability to store enough power to operate any of the electrically driven components of the vehicle 9' if the main power supply malfunctions or is lost. Such situations may e.g. be when the battery 208 is to be exchanged. The battery exchange is typically taking place on two different locations, i.e. the battery to be replaced (the "empty" battery) is dropped off at a different location than where the replacement battery is picked up ("fully charged" battery), therefore the capacitor power supply may be used to move the robot between the two different locations. Alternatively, if the main battery malfunctions, the capacitor power supply can be used to operate the lifting device and/or move the robot to a service area. Furthermore, any regenerated power can be supplied to the capacitor power supply to ensure that the capacitor power supply has sufficient power capacity to perform any of its desired functions.

FIG. 10B is another view of a container handling vehicle of FIG. 10A, where it is disclosed a lifting device motor 211' and angled gear 215 arranged in the second section 205. The lifting device motor 211' is connected at one end of a rotatable lifting shaft (not shown) of a lifting device arranged in the first section. This lifting device motor 211' may replace other lifting device motor(s) (not shown) arranged in the first section or function as an auxiliary motor in addition to any lifting device motors arranged in the first section. Thus, the second section 205 makes it possible to reduce the number of lifting device motor(s) in the first section to a minimum (even avoid the use of a lifting device motor in the first section) because the size and lifting capacity of the lifting device motor 211 arranged in the second section 205 is not limited by the available space of the first section. In other words, the lifting device motor 211 in the second section may be the sole lifting device motor of the vehicle, such that the available space in a top section or top portion of the first section of the vehicle 9' is increased, or the motor 211 may be an auxiliary motor providing an increased lifting capacity to the lifting device.

FIG. 10C is another view of FIG. 10A, where it is disclosed a first battery 213' and a second battery 213" in the second section 205. The inner cross-sectional area of the second section 205 is the cross-sectional area spanning from the intersection (i.e. connection plate 212) between the first and second section to an outer wall of the second section in one lateral direction (e.g. Y direction) and between two opposing walls in the other lateral direction (e.g. X direction). As disclosed, both the first and second battery 213', 213" are smaller than an inner (horizontal) cross-sectional area of the second section 204.

FIG. 10D is a view from below of FIG. 10C.

FIG. 10E shows an example of container handling vehicle with a first battery 213' with a lateral extension in the X and Y direction substantially equal to the lateral extension of an inner cross-sectional area of the second section 205.

Figure 10H:
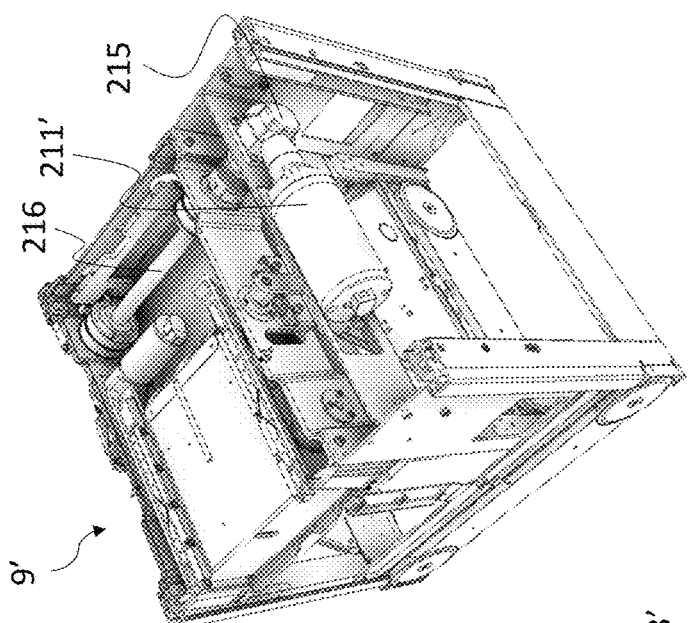
FIGS. 10G and 10H are different views of an alternative container handling vehicle of FIG. 10F, where the lifting device motor and angle gear are rotated 90 degrees relative the lifting device motor and angled gear of FIG. 10F.
Figure 10G:
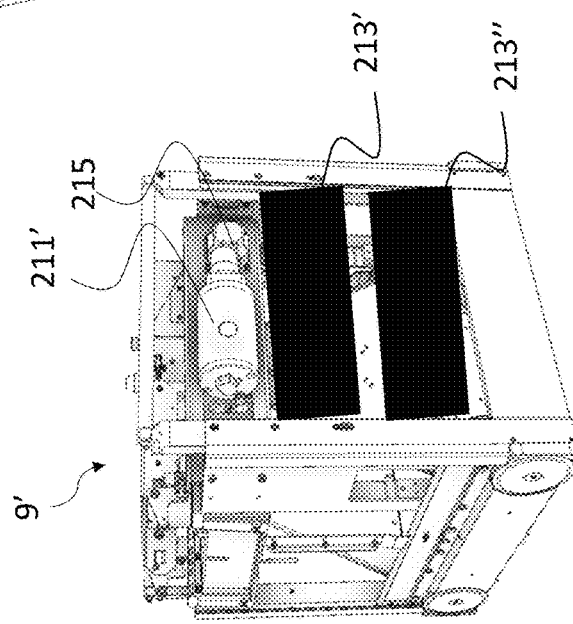
Figure 10F:
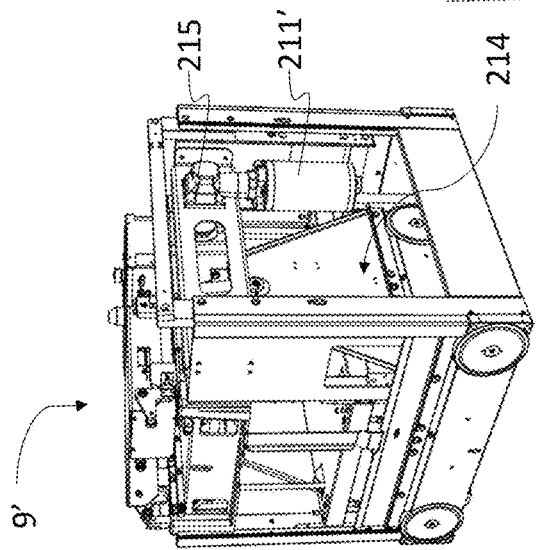
FIG. 10F is perspective view of an alternative container handling vehicle of FIG. 10B, where a lifting device motor and gear can be seen in the second section.

FIG. 10F is perspective view of an alternative container handling vehicle of FIG. 10B, where a lifting device motor and angle gear can be seen in the second section. The embodiment serves to illustrate how the available space of the second section allows for the use of a more powerful (and consequently larger) lifting device motor 211' than what would be possible to arrange in the first section alone. This allows for the use of storage containers having a higher total weight (i.e. the weight including products stored in the container). It is noted that the prior art vehicle in FIGS. 2B and 2C would likely have available space for a similar large lifting device motor, but would not be able to fully utilize the possibility of increased lifting capacity due to the cantilever design.

Again referring to FIG. 10F, the angled gear 215 with connected lifting device motor 211' is angled downwards (i.e. in a mainly vertical direction).

In contrast, as seen in FIGS. 10G and 10H, a similar embodiment as in FIG. 10F is shown, however, the angled gear 215 with connected lifting device motor 211' is angled sideways (i.e. in a mainly horizontal direction), rotated 90 degrees relative to the embodiment in FIG. 10F. Furthermore, FIG. 10H shows the lifting device axle 216 to which axle lifting bands connected to the lifting device 18 (not shown in FIG. 10E) are connected and coils up and reels out during lifting and lowering of the lifting device.

Figure 10K:
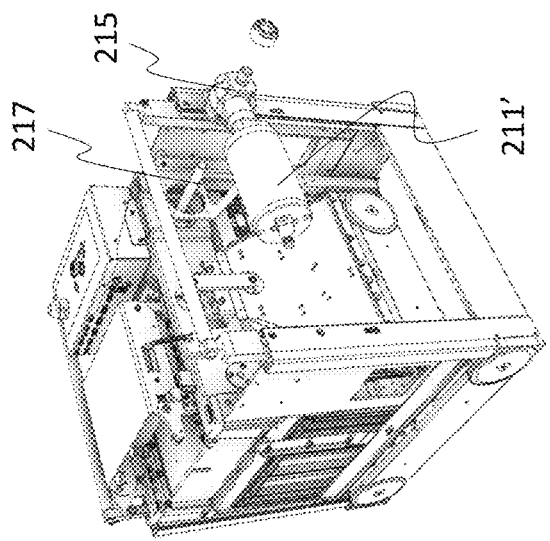
FIG. 10K is an exploded view of a hollow shaft gear used to connect the lifting device motor and the lifting axle.
Figure 10J:
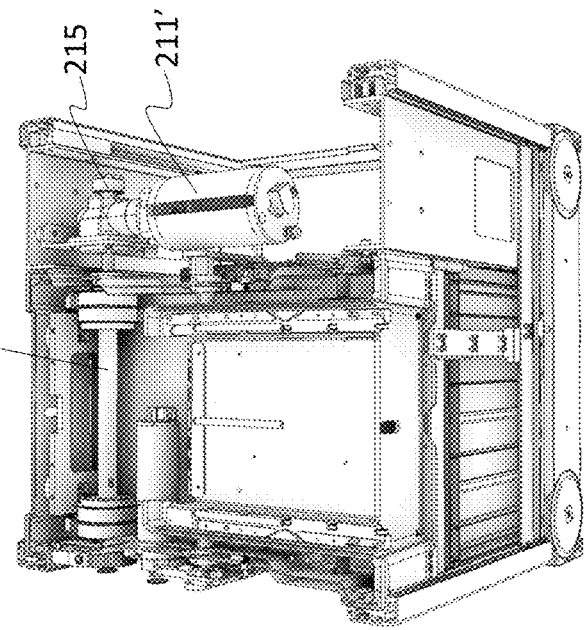
FIGS. 10I and 10J are perspective views of an alternative container handling vehicle of FIG. 10B, where a lifting device motor and hollow shaft gear can be seen in the second section.
Figure 10I:
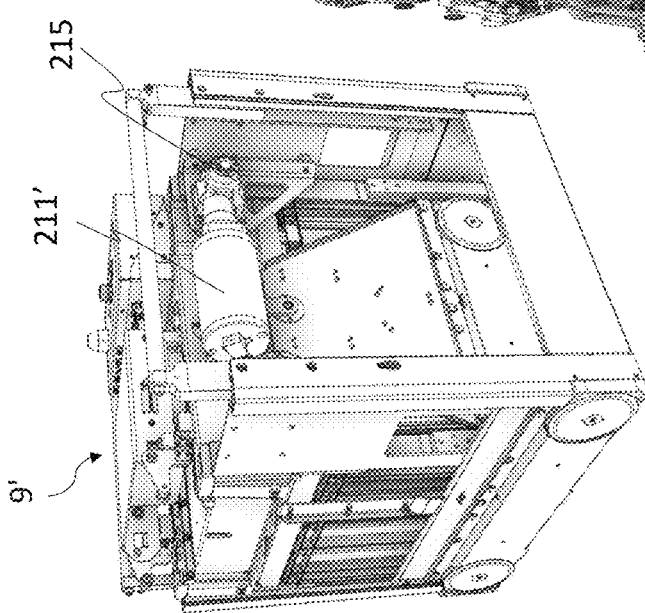

FIGS. 10I and 10J are perspective views of an alternative container handling vehicle of FIG. 10B, where the lifting device motor 211' and a hollow shaft gear 215 are arranged in the second section.

FIG. 10K is an exploded view of a hollow shaft gear 215 used to connect the lifting device motor 211' and lifting device axle 216. Compared to the embodiment of FIGS. 10F-10H, the lifting axle 217 of FIGS. 10I-10K has been extended and the gear 215 is connected directly to the extended lifting axle 217 without a dedicated connection. To be able to make this direct connection, a hollow shaft gear 215 is used instead of an angled gear.

Figure 11B:
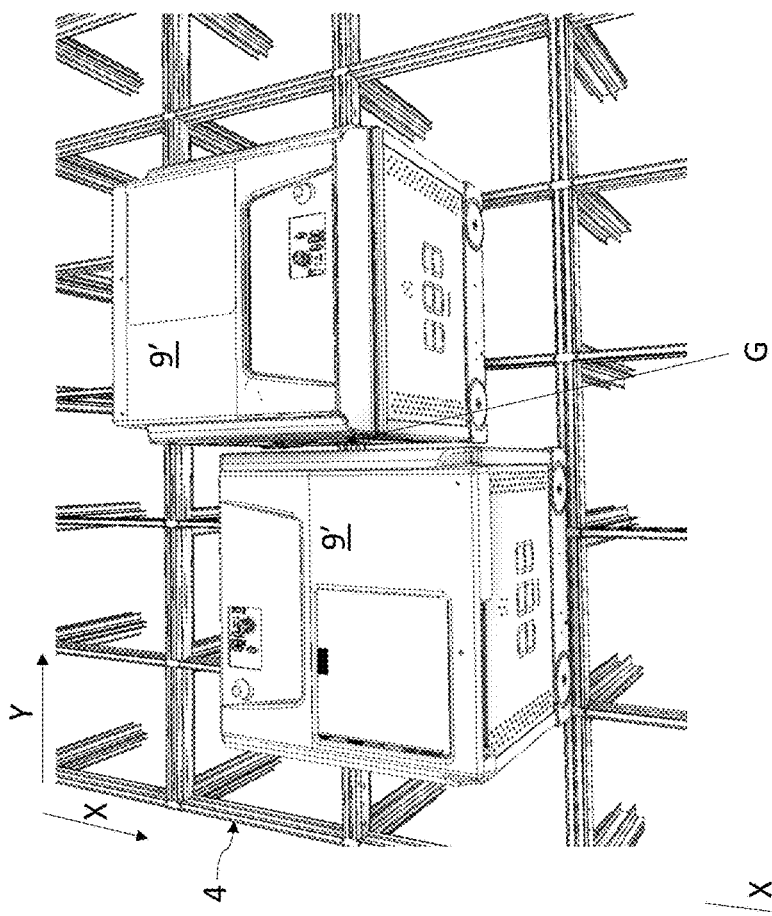
FIG. 11B is a top view of FIG. 11A.
Figure 11A:
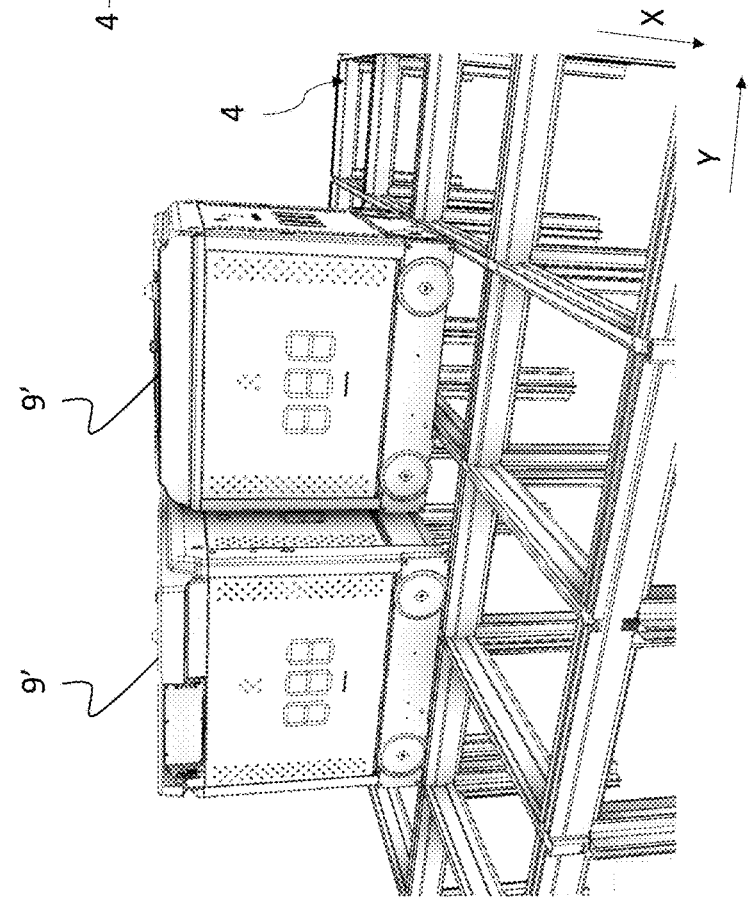
FIG. 11A is a side view of two container handling vehicles passing each other in the X direction of a rail system.

FIG. 11A is a side view of two container handling vehicles 9' travelling in the X direction of the rail system 8 passing each other using a total of three cells in the Y direction of the rail system 8. This particular rail system comprises single track rails in the X direction and double-track rails in the Y direction. The combination of single- and double-track rails may in some instances be the most cost-efficient solution, even if a rail system using only double-track rails is optimal regarding the possible travel paths of the container-handling vehicles arranged thereon. FIG. 11B is a top view of FIG. 11A showing a gap G between the vehicle bodies 13 in the Y direction allowing the two vehicles 9' travelling in the X direction to occupy only three rows in the Y direction.

FIG. 11C is another side view of FIG. 11A, showing a gap between the two container handling vehicles passing each other in the X direction of the rail system.

FIG. 11D is an underside view of two container handling vehicles passing each other.

FIGS. 12A-C are plan views showing differences in the center of gravity of the storage containers inside the storage container cavity relative the center of the footprint of the vehicle body, where FIG. 12A illustrates a prior art single cell robot, FIG. 12B is a prior art central cavity robot, and FIG. 12C shows the container handling vehicle according to the present invention.

FIG. 12A shows a single cell vehicle having a central cavity. The center of gravity of a storage container CGSC is in the center of the cavity which coincides with the center of the footprint of the vehicle body CGV.

FIG. 12B shows a wider vehicle having a central cavity. The center of gravity of a storage container CGSC is in the center of the cavity which coincides with the center of the footprint of the vehicle body CGV.

FIG. 12C shows an exemplary container handling vehicle according to the present invention, where the center of gravity of a storage container CGSC is displaced relative the center of the footprint of the vehicle body CGV.

FIGS. 13A-C are plan views showing differences in imaginary lines extending between each of two pairs of opposed wheels in the same sets of wheels, and which of said lines which intersect or not intersect imaginary lines between other wheels, where FIG. 13A illustrates a prior art single cell robot, FIG. 13B is a prior art central cavity robot, and FIG. 13C shows an exemplary container handling vehicle according to the present invention.

FIG. 13A shows a single cell vehicle having a central cavity. Each imaginary line L1, L2, L3, L4 extending between each of two pairs of opposed wheels in each set of wheels intersects two other imaginary lines L1, L2, L3, L4.

FIG. 13B shows a vehicle with a central cavity. None of the imaginary lines L1, L2, L3, L4 extending between each of two pairs of opposed wheels in each set of wheels intersects another imaginary line L1, L2, L3, L4.

FIG. 13C shows an exemplary container handling vehicle according to the present invention where imaginary lines L1, L2 between each of two pairs of opposed wheels in the first set of wheels intersect one imaginary line L3 extending between two wheels in the second set of wheels, and where one imaginary line L4 between two wheels in the second set of wheels does not intersect any imaginary lines.

The invention has been described with reference to the Figures, however the skilled person will understand that there may be made alterations or modifications to the described embodiments without departing from the scope of the invention as described in the attached claims.

| Reference numerals | |
|---|---|
| (1) underlying storage system/frame structure | (201''') third wheel first set of wheels |
| (3) horizontal member | (201'''') fourth wheel first set of wheels |
| (4) three-dimensional grid, storage grid | (202') first wheel second set of wheels |
| (5) storage column | (202'') second wheel second set of wheels |
| (6, 6') storage container/storage bin | |
| (7) stacks | (202''') third wheel second set of wheels |
| (8) rail system | |
| (9, 9') container handling vehicle, vehicle | (202'''') fourth wheel second set of wheels |
| (10) first set of rails or tracks | |
| (11) second set of rails or tracks | (203) first motor |
| (10, 10b) track in X direction | (203) second motor |
| (11a, 11b) track in Y direction | (203) motor assembly |
| (12) grid column | (204) first section |
| (12a, 12b) tracks | (205) second section |
| (13) vehicle body | (206) interface |
| (14) grid cell | (208) battery |
| (14E) adjacent grid cell | (209) battery receiving unit |
| (14N) adjacent grid cell | (210) controller unit |
| (14S) adjacent grid cell | (211') lifting device motor |
| (14W) adjacent grid cell | (212) connection plate |
| (15) grid opening/grid cell opening | (213') batteries |
| (15E) grid opening | (214) wheel displacement assembly |
| (15N) grid opening | (215) Gear |
| (15S) grid opening | (216) Lifting device axle |
| (15W) grid opening | (217) Extended lifting axle |
| (17) lifting frame | (DP) Downward projection |
| (18) lifting device | (P) horizontal plane |

-continued

| Reference numerals | |
|---|---|
| (19) first port column | (X) first direction |
| (19) drop-off port | (Y) second direction |
| (20) second port | (Z) vertical direction |
| (20) pick-up port | (FV) footprint of container handling vehicle |
| (21) cavity | |
| (22) first set of wheels | (F1) footprint first section |
| (23) second set of wheels | (F2) footprint second section |
| (30, 30') footprint prior art container handling vehicle | (G) Gap |
| | (L1) imaginary line |
| (201') first wheel first set of wheels | (L2) imaginary line |
| (201") second wheel first set of wheels | (L3) imaginary line |
| | (L3) imaginary line |
| | (L4) imaginary line |
| | (CGSC) center of gravity storage container |
| | (CGV) center of footprint vehicle body |
| | (LX) lateral extension, length X direction |
| | (LY) lateral extension, length Y direction |

The invention claimed is:

1. A container handling vehicle for picking up storage containers from a three-dimensional grid of an underlying storage system, comprising:
   a first set of wheels, for moving the vehicle along a first direction on a rail system in the grid;
   a second set of wheels, for moving the vehicle along a second direction on the rail system in the grid, the second direction being perpendicular to the first direction; wherein
   a vehicle body comprises walls on all sides and forms a quadrilateral footprint, the footprint being defined by horizontal peripheries in the first and second directions of the vehicle body, and the container handling vehicle further consists of:
   a first section and a second section arranged side-by-side such that a centre point of a footprint of the first section is arranged off centre relative a centre point of the footprint formed by the vehicle body, the first and second sections are separated by a wheel connecting element, and
   wherein the first set of wheels comprises two pairs of wheels, including a first and third wheel and a second and fourth wheel, respectively, arranged on opposite portions of the first section, wherein the first and third wheel of the first set of wheels are connected to the vehicle body and the second and the fourth wheel of the first set of wheels are connected to the wheel connecting element; and
   wherein the second set of wheels comprises two pairs of wheels, including a first and third wheels and a second and fourth wheel, respectively, arranged on opposite portions of the vehicle body, wherein two of the wheels in the second set of wheels are arranged on opposite sides of the second section and the other two wheels in the second set of wheels are arranged on opposite sides of the first section;
   wherein a size ratio of a footprint of the first section relative a footprint of the second section is at least 2:1, and wherein
   the first section is configured to accommodate a storage container, and
   the second section comprises at least a first battery.

2. The container handling vehicle according to claim 1, wherein the at least first battery is fixed.

3. The container handling vehicle according to claim 1, wherein the at least first battery is exchangeable.

4. The container handling vehicle according to claim 1 further comprising a lifting device arranged at an upper level of the first section and wherein the at least first battery is arranged at or below the upper level.

5. The container handling vehicle according to claim 1 wherein the first section has a rectangular footprint where two of the sides are longer than the two other sides, and wherein the second section is adjacent a long side of the first section.

6. The container handling vehicle according to claim 1, wherein the first section comprises four corners, and wherein an outer rim of the first second, third and fourth wheels of the first set of wheels and the first and second wheels of the second set of wheels are arranged at or near each corner of the first section.

7. The container handling vehicle according to claim 6, wherein the at least four wheels in, or in connection with the second section, are arranged such that the weight of the at least first battery is at least distributed to the four wheels.

8. The container handling vehicle according to claim 1, further comprising at least a second battery arranged in the second section above or below the first battery.

9. The container handling vehicle according to claim 8, wherein the at least four wheels in, or in connection with the second section, are arranged substantially vertically below the at least first battery.

10. The container handling vehicle according to claim 1, comprising an exchangeable battery arranged in the first section.

11. The container handling vehicle according to claim 1, wherein the second section comprises an assembly of motors comprising a first motor for driving the first set of wheels and a second motor for driving the second set of wheels.

12. An automated storage and retrieval system comprising a three-dimensional grid and at least one container handling vehicle according to claim 1, the grid comprises a rail system, on which the container handling vehicle may move, and a plurality of stacks of storage containers;
   the rail system comprises a first set of parallel tracks arranged in a horizontal plane and extending in a first direction, and a second set of parallel tracks arranged in the horizontal plane and extending in a second direction which is orthogonal to the first direction, wherein the first and second sets of tracks form a grid pattern in the horizontal plane comprising a plurality of adjacent grid cells, each grid cell comprising a grid opening defined by a pair of opposed tracks of the first set of tracks and a pair of opposed tracks of the second set of tracks;
   the plurality of stacks of storage containers are arranged in storage columns located beneath the rail system, wherein each storage column is located vertically below a grid opening.

13. The automated storage and receiving system according to claim 12, wherein an extent of the footprint of the container handling vehicle in the first direction, LX, and second direction, LY, is:
   LX=1.0 grid cell in the first direction, and
   1<LY<1.5 grid cells in the second direction,
      wherein a grid cell is defined as the cross-sectional area, including width of the tracks, between the midpoint of two rails running in the first direction and the midpoint of two rails running in the second direction.

14. The automated storage and receiving system according to claim 12, wherein the second section protrudes less than 50% into the neighboring grid opening.

* * * * *